United States Patent
Nitschke

(10) Patent No.: US 11,743,054 B2
(45) Date of Patent: Aug. 29, 2023

(54) METHOD AND SYSTEM FOR CREATING AND CHECKING THE VALIDITY OF DEVICE CERTIFICATES

(71) Applicant: Phoenix Contact GmbH & Co. KG, Blomberg (DE)

(72) Inventor: Torsten Nitschke, Dortmund (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 111 days.

(21) Appl. No.: 17/077,951

(22) Filed: Oct. 22, 2020

(65) Prior Publication Data
US 2021/0044441 A1  Feb. 11, 2021

Related U.S. Application Data

(62) Division of application No. 15/119,095, filed as application No. PCT/EP2015/053622 on Feb. 20, 2015, now Pat. No. 10,841,102.

(30) Foreign Application Priority Data

Feb. 20, 2014  (DE) .......................... 102014102168.1

(51) Int. Cl.
| | | |
|---|---|---|
| *H04L 9/32* | (2006.01) | |
| *H04L 9/08* | (2006.01) | |
| *H04L 9/00* | (2022.01) | |

(52) U.S. Cl.
CPC .......... *H04L 9/3265* (2013.01); *H04L 9/0897* (2013.01); *H04L 9/3247* (2013.01);
(Continued)

(58) Field of Classification Search
CPC ... H04L 9/3265; H04L 9/0897; H04L 9/3247; H04L 9/3268; H04L 9/3297; H04L 9/50
See application file for complete search history.

(56) References Cited

U.S. PATENT DOCUMENTS

| | | | |
|---|---|---|---|
| 6,389,537 B1 | 5/2002 | Davis et al. | |
| 8,032,744 B2 * | 10/2011 | Doonan | G06F 21/64 |
| | | | 713/156 |

(Continued)

FOREIGN PATENT DOCUMENTS

| | | |
|---|---|---|
| CN | 101395624 A | 3/2009 |
| CN | 102790678 A | 11/2012 |
| CN | 103081399 A | 5/2013 |

OTHER PUBLICATIONS

"Trusted Platform Module Technology Overview", URL: http://technel.microsofl.com/de-de/library/jj131725.aspx, Feb. 1, 2012, Publisher: Microsoft Technet, Published in: DE.

(Continued)

*Primary Examiner* — Harris C Wang
(74) *Attorney, Agent, or Firm* — Kaplan Breyer Schwarz, LLP

(57) ABSTRACT

To easily identify an invalid device certificate by means of a validity check when signing keys that are used to create device certificates are compromised, a piece of status information is provided for device certificates that comprises positive evidence of the existence and validity of the device certificate, and alternatively or additionally to apply a special validity model for device certificates, wherein the time of issue of the device certificate is documented by means of a signed electronic timestamp, and wherein a different signing key is used for signing the timestamp than for signing the device certificate. Additionally, all information that is required for the validity check of a device certificate is stored in a memory of the device or in a memory associated with the device, so that an identity check on the device can be performed at any time without fetching additional data.

7 Claims, 8 Drawing Sheets

(52) U.S. Cl.
CPC .......... *H04L 9/3268* (2013.01); *H04L 9/3297* (2013.01); *H04L 9/50* (2022.05)

(56) References Cited

U.S. PATENT DOCUMENTS

| | | | | |
|---|---|---|---|---|
| 2002/0152382 | A1* | 10/2002 | Xiao ................... | G06F 21/604 713/173 |
| 2003/0084311 | A1* | 5/2003 | Merrien ............... | H04L 9/3268 713/191 |
| 2005/0144440 | A1* | 6/2005 | Catherman .......... | H04L 9/3236 713/156 |
| 2005/0149723 | A1* | 7/2005 | Watkins .............. | H04L 63/0823 713/156 |
| 2006/0117185 | A1 | 6/2006 | Oguri et al. | |
| 2007/0079120 | A1* | 4/2007 | Bade .................. | G06F 21/57 713/166 |
| 2007/0220259 | A1* | 9/2007 | Pavlicic ............... | H04L 9/3297 713/176 |
| 2008/0114984 | A1 | 5/2008 | Srinivasan et al. | |
| 2009/0198618 | A1* | 8/2009 | Chan ................... | G06F 21/445 707/E17.014 |
| 2009/0239503 | A1* | 9/2009 | Smeets ................ | H04W 12/04 455/411 |
| 2010/0071040 | A1* | 3/2010 | Upp ..................... | H04L 63/20 719/330 |
| 2011/0010543 | A1* | 1/2011 | Schmidt .............. | H04W 12/06 713/168 |
| 2013/0132718 | A1* | 5/2013 | Agrawal .............. | H04L 9/3268 713/178 |
| 2013/0283042 | A1 | 10/2013 | Xiao | |
| 2017/0054566 | A1* | 2/2017 | Nitsch ................. | H04L 9/3268 |

OTHER PUBLICATIONS

Authorized Officer: Chantal Gottar, "International Search Report" issued in counterpart PCT Application No. PCT/EP2015/053622, dated May 13, 2015, Publisher: PCT.
Authorized Officer: M. Di Felice, English Translation of "International Search Report" issued in counterpart PCT Application No. PCT/EP2015/053622, dated May 13, 2015, Publisher: PCT.
Authorized Officer: Nora Lindner, English Translation of the "International Preliminary Report on Patentability" issued in counterpart PCT Application No. PCT/EP2015/053622, dated Sep. 1, 2016, Publisher: PCT.
Chinese Office Action issued in related Chinese Patent Application No. 201580009740.4 dated Aug. 2, 2018.
Examiner initiated interview summary (PTOL-413B) Mailed on Jul. 10, 2020 for U.S. Appl. No. 15/119,095.
"Office Action" issued in counterpart German Patent Application No. 10 2014 102 168.1, dated Dec. 17, 2014, Published in: DE.
Final Office Action received for U.S. Appl. No. 15/119,095, dated Nov. 20, 2019, 26 pages.
Final Rejection received for U.S. Appl. No. 15/119,095, dated Dec. 31, 2018, 20 pages.
Jan De Clercq, "Validating Digital Certificates in Windows PKI", URL: http://windowsitpro.com/security/validating-digital-certificates-windows-pki, Jul. 18, 2004, Publisher: Windows IT Pro.
Jin-Bum Hwang et al., "Two Layered PKI Model for Device Authentication in Multi-Domain Home Networks", XP010937934, DOI: 10.1109/ISCE.2006.1689451; ISBN: 978-1-4244-0216-8, 2006 IEEE Tenth International Symposium, Jun. 28, 2006, pp. 1-6, Publisher: IEEE.
Notice of Allowance and Fees Due (PTOL-85) dated Jul. 10, 2020 for U.S. Appl. No. 15/119,095.
Srdjan Capkun et al., "Self-Organized Public-Key Management for Mobile Ad Hoc Networks", XP-002292469, "Technical Reports in Communications", May 28, 2002, pp. 1-17, Publisher: Science of Ecolepolytechnique Federale de Lausanne, Published in: CH.
English Translation of "Office Action" issued in counterpart German Patent Application No. 10 2014 102 168.1, dated Oct. 10, 2022, Published in: DE.

* cited by examiner

METHOD AND SYSTEM FOR CREATING AND CHECKING THE VALIDITY OF DEVICE CERTIFICATES

CROSS-REFERENCE TO RELATED APPLICATIONS

This application is a divisional of U.S. patent application Ser. No. 15/119,095 filed on Aug. 15, 2016, which is a 371 National Stage Application of PCT International Application No. PCT/EP2015/053622, filed on Feb. 20, 2015, which claims priority to German Patent Application No. 102014102168.1, filed on Feb. 20, 2014. The entire disclosures of U.S. patent application Ser. No. 15/119,095, PCT International Application No. PCT/EP2015/053622, and German Patent Application No. 102014102168.1 are incorporated herein by reference.

FIELD OF THE INVENTION

The invention generally relates to device certificates, i.e. electronic certificates for confirming the identity of a device, and more particularly relates to a method and a system for creating device certificates and checking the validity of device certificates.

BACKGROUND OF THE INVENTION

Electronic certificates are used to confirm information, in particular specific characteristics of persons or objects in a manner that allows for an authenticity and integrity check using cryptographic methods, the certificate usually including the data required for the check.

In particular, an electronic certificate is digitally signed by an issuing certification authority, wherein the digital signature forms part of the certificate. Often, a cryptographic checksum is determined from the information to be certified, for example by using a hash function, and only this checksum is digitally signed with the private part of an asymmetric key pair of the certification authority. In this way, the authenticity of the certified information can be verified using the public key of the certification authority, by determining the original cryptographic checksum using the public key method and comparing it with a cryptographic checksum that is again determined from the certified information, wherein authenticity of the certified information is given in case of a match of the cryptographic checksums.

In Germany, legal validity of electronic signatures is regulated by the German Digital Signature Act (Signaturgesetz) and the German Signature Ordinance (Signaturverordnung) according to which, by law, qualified electronic signatures are recognized as legally equal to handwritten signatures, with few exceptions. For qualified electronic signatures there are specific requirements with regard to the signature creation process, the means used for it, and in particular the certification services issuing the necessary qualified certificates. Qualified electronic signatures are always created by natural persons. Accordingly, the owner of a qualified electronic certificate for signatures is always a natural person.

To confirm the identity of a device, electronic certificates are used which are referred to as device certificates, wherein device certificates are used to enable a device owner to verify the authenticity of a device, inter alia. A certificate with this purpose is referred to as a certificate of authenticity. In addition, a device owner may use self-issued device certificates to identify his property. Such certificates are referred to as ownership certificates.

Accordingly, a certificate of authenticity is a device certificate which was created by a device manufacturer to confirm the authenticity of a device manufactured by him. Authenticity in this context means that a device actually originates from a particular manufacturer. For this purpose, when producing the device, a device manufacturer issues a certificate for a unique secret existent only in that device. The device manufacturer discloses the verification criteria for these certificates, so that an owner can verify the authenticity of the devices.

Such certificates are described in relevant literature. For example, IEEE standard 802.1AR-2009 (IEEE Standard for Local and metropolitan area networks—Secure Device Identity, 2009) specifies a so-called Initial Secure Device Identifier (IDevID) consisting of a secret in form of a private key and a certificate in form of a public key certificate in conformity with the X.509 certificate described in RFC 5280 (Internet X.509 Public Key Infrastructure Certificate and Certificate Revocation List (CRL) Profile). The X.509 Public Key Infrastructure will be referred to as PKIX for short below.

Furthermore, the specification of the Trusted Platform Module (TPM) of the Trusted Computing Group specifies, in Part 1 inter alia, (TPM Main Part 1 Design Principles Specification Version 1.2, Revision 116, Mar. 1, 2011, TCG), a so-called "endorsement key" consisting of an asymmetric key pair comprising a private key designated PRIVEK and a public key designated PUBEK for the purpose of confirming the authenticity of the TPM chip by means of an electronic signature, for example by means of a certificate. A corresponding certificate is referred to as EK certificate below.

An endorsement key (EK) of a TPM chip can be checked by means of a publicly known root certificate. Furthermore, platform manufacturers such as circuit board or device manufacturers integrating a TPM may create an attribute certificate called "Platform Endorsement Certificate" to confirm the integration of a TPM chip with a unique endorsement key in a particular platform. Thus, it is known from the prior art to document the manufacturing of devices and their authenticity by means of electronic signatures and to enable the later device owner to check them.

Usually, asymmetric key pairs, also referred to as Manufacturer's Attestation Keys (MAKey) below, are in use at the device manufacturer's. The certificate belonging to the MAKey and referred to as MACert is usually used in the rank of a so-called intermediate certificate (intermediate CA certificate, sub-CA certificate) of a certification authority as part of a certificate chain. This certificate is directly or indirectly confirmed by the certification authority of the manufacturer, for example by the root key of the certification authority referred to as Manufacturer's Trust Anchor Key, short MTAKey, having been used to digitally sign it. The root key is usually confirmed by a self-signed root certificate, also referred to as Manufacturer's Trust Anchor Certificate, short MTACert, and is published by the manufacturer.

The private part of the MAKey is used at a production workstation. Should such a private part be copied or abused it would not be possible to distinguish genuine device certificates from abusively created device certificates. In such cases, the associated sub-CA certificate is usually revoked. In order for this to prove effective, additionally revocation information have to be gathered during the checking of certificate chains. Revocation information is usually provided through regular publication of a Certificate Revocation List (CRL) or relatively promptly by revocation information services, such as an OCSP server (Online Certificate Status Protocol server), for example according to RFC 2560.

According to RFC 5280, the validity periods of the certificates have to be observed during the verification of a certificate chain. This especially applies if revocation information have to be considered. In the procedure specified in RFC 5280, the validity of a certificate chain is checked for a given point in time t, usually for the current time. The point in time t must be included within the validity period of all certificates of the chain, and for all certificates of the chain with the exception of the root certificate revocation information sufficiently recent with respect to t and valid must be available, wherein revocation information typically also specifies a validity period.

Revocation of a sub-CA certificate has the consequence that all device certificates already issued and thus to be checked become invalid. As a countermeasure, a device manufacturer has to issue new device certificates for the affected devices on the basis of his device database, for example in the form of EK certificates if TPMs are used. For this reason, the public parts of used asymmetric key pairs such as of an endorsement key (EK) have to be archived in a device database during the manufacturing of the devices. However, the issuing of new device certificates implies effort and cost, especially if the devices are difficult to reach or unreachable in the field.

Because of the cost in case of compromisation of private keys associated with sub-CA certificates, revocation of sub-CA certificates is often dispensed with in practice, and, if applicable, commercial measures for damage control are applied. Often, there are no procedures to be followed in the event of a compromise.

Another problem is that the revocation information must be made available at the site of verification, however, depending on the application a connection to a communications network might not be available at the site of verification.

An ownership certificate is a device certificate which is issued by a device owner for his device in order to confirm that the latter is his property and thus represents an identification criterion for his ownership. To this end, a device owner issues a certificate for a unique secret only existent in the device when the device becomes his property and optionally repeatedly during his ownership. The device owner uses the verification criteria associated with the certificate to efficiently determine at any time whether a device is part of his property or not. Furthermore, the devices of the owner use these certificates among each other to mutually prove to each other their identity and membership of the trusted domain of the owner.

From document RFC 5916 (device owner attribute) of the Internet Engineering Task Force (IETF), for example, an attribute for public key certificates and attribute certificates is known, by means of which the ownership of a device can be designated. A purpose mentioned for this attribute is, for example, its use in an automatic decision about trustworthiness between two communicating devices which will trust each other, for example, if their certificates specify the appropriate owner.

Usually, device manufacturers use device certificates that are compatible with the PKIX standard for their devices so as to ensure the highest possible interoperability. In particular the validity model for certificate chains as defined by the PKIX standard is used.

For creating device certificates, some device owners use their own certification service which signs device certificates with a key referred to as Device Owner's Attestation Key (DOAKey), wherein also a plurality of keys of this type (DOAKey1, DOAKey2, DOAKey3, . . . ) may be used. Analogously to the keys MAKey and MTAKey and the certificates MACert and MTACert respectively described above and with similar utilization, usually a certificate referred to as Device Owner's Attestation Certificate (DO-ACert) is provided for a DOAKey, and a key referred to as Device Owner's Trust Anchor Key (DOTAKey) of the root entity of the certification service and an associated certificate Device Owner's Trust Anchor Certificate (DOTACert) are provided.

The difference to the above-described keys MAKey and MTAKey and certificates MACert and MTACert, respectively, is that the device owner controls the use of his keys and certificates and creates and introduces the device certificate created by himself only after reception of the device. For the device certificate either an existing key pair of the device is used, such as the EK in the TPM of a device, or a new key pair is created in the device, for example using a TPM, or a new key pair is created by the device owner and introduced into the device.

When keys for issuing device certificates (DOAKey1, DOAKey2, DOAKey3, . . . ) are compromised, the same difficulties and costs exist for the device owner as described above for the device manufacturer. In case of a validity model according to the PKIX standard, all device certificates signed with the respective key become invalid and have to be replaced. For industrial devices it is absolutely possible that they are installed in inaccessible places in the field, so that the exchange is cumbersome.

Moreover, the problem as described above may also arise in this case, namely that at the verification site there might be no access to a communications network for providing the revocation information.

SUMMARY OF THE INVENTION

Therefore, it is an object of the present invention to show a way how the above-described problems of the prior art can be reduced or avoided, and more particularly to show a way how creation and validity check of device certificates can be simplified and/or improved, in particular in case of compromised signing keys that are used to create device certificates and in case no communication link is available at the time of the validity check.

This object is achieved by the illustrative embodiment of the present invention.

A basic idea of the invention is to provide a piece of status information for device certificates that comprises positive evidence of the existence and validity of the device certificate, and alternatively or additionally to apply a special validity model for device certificates, wherein the time of issue of the device certificate is documented by means of a signed electronic timestamp, wherein a different signing key is used for signing the timestamp than for signing the device certificate.

Another aspect of the invention is to store all information required for the validity check of a device certificate that is stored in a memory of a device, also in a memory of the device, so that an identity check of the device can be performed at any time without fetching additional data, i.e. an offline check of the stored device certificate is made possible.

Accordingly, a method for creating device certificates for electronic devices comprises to provide an electronic device to be certified that has a secret stored therein which is not readable from outside the device, to create a device certificate for this device, whose certificate information is cryptographically bound to the secret stored in the device, wherein the device certificate comprises a digital signature generated using a signing key and is authenticatable by means of a certificate chain.

The certificate chain is a sequence of at least two certificates starting with the device certificate, wherein each certificate of the certificate chain comprises an information defining the validity period of the respective certificate, and wherein each certificate of the certificate chain with the exception of the device certificate comprises a certificate information by means of which the respective previous certificate in the sequence is authenticatable.

When using asymmetric key pairs, the authenticity of the signature of the device certificate can be checked using the public part of the signing key of the issuer of the device certificate. For checking the authenticity of the public part of the signing key of the issuer of the device certificate, a further digital certificate is provided. For checking the authenticity of the public part of the signing key of the issuer of this further digital certificate, again a further certificate can be provided. In this way, the certificate chain is established as a sequence of certificates starting with the device certificate, each of which confirm the authenticity of the public key by means of which the previous certificate can be checked. A certificate chain is also referred to as a validation path or certification path.

The certificate chain comprises the device certificate and at least one further certificate. Since the last certificate in the certificate chain is not followed by another certificate, this is preferably a trusted certificate for which verification of authenticity can be dispensed with.

Furthermore, according to a first variant the method comprises to create a confirmation information for the created device certificate, which confirms that the device certificate was created by an authorized entity. The pieces of status information are typically provided by a certificate information service.

The confirmation information may for example comprise that the device certificate or an information derived from the device certificate is stored in retrievable manner, for example in a database which is typically provided by the entity issuing the device certificates.

Advantageously, the method may also comprise to provide a digitally signed piece of status information for the device certificate, which comprises a proof that the device certificate was created by an authorized entity, wherein the piece of status information is generated in response to the confirmation information or only if a corresponding confirmation information is available. Furthermore, advantageously also a digitally signed piece of status information for at least one further certificate in the certificate chain may be provided, which comprises a proof that the further certificate was created by an authorized entity.

According to a second variant, the method further comprises to generate a digitally signed timestamp which associates the device certificate with the point in time at which the timestamp is generated. The digitally signed timestamp is preferably generated so that the device certificate or a hash value of the device certificate along with the current time indication, for example in the form of date and time, is digitally signed using a signing key.

In a particularly preferred embodiment of the method, the first and second variant described above are combined.

In the second variant of the method, the digitally signed timestamp is preferably generated by a server which provides a timestamp service, in response to a request for generation of a timestamp. For example, the request is transmitted from a production computer connected to the server via a communications network to the server, and the generated timestamp is returned to the production computer, wherein the request preferably comprises the device certificate or a hash value of the device certificate.

The created device certificate and/or at least one further certificate of the certificate chain and/or the digitally signed timestamp and/or at least one digitally signed piece of status information is provided in accessible form in a manner so as to be attributable to the device. This may be accomplished, for example, by storing in a readable memory or storage medium associated with the electronic device or arranged in the electronic device. For example, a flash memory of the device can be used as memory, or a storage medium such as a CD is enclosed with the device. Alternatively, the generated device certificate and/or at least one further certificate of the certificate chain and/or the digitally signed timestamp and/or at least one digitally signed piece of status information can be made accessible, for example via an Internet server, which provides the data for example in response to a device identifier such as a serial number of the device. This may be accomplished, for example, by establishing an appropriate directory service.

Advantageously, the generated timestamps are counted, and the server only generates and transfers the timestamp as long as a predefined upper limit of the number of generated timestamps is not exceeded. To this end, preferably, a value of this upper limit is transferred to and stored in the server which provides the timestamp service. The counting of the timestamps is for example performed by initially setting a counter stored in the server to zero, which is then incremented upon each request to generate a timestamp and is compared with the stored value of the upper limit. If the counter is less than or equal to the value of the upper limit, a timestamp is generated and transferred to the production computer, otherwise no timestamp is generated, wherein in the latter case an appropriate error message is preferably transmitted to the production computer.

In this way, only for a predetermined limited number of devices a respective device certificate with associated timestamp can be created. This is particularly advantageous for monitoring production quotas in contract manufacturing of electronic devices.

To increase security, preferably different signing keys are used for generating the digital signature of the device certificate and for generating the digital signature of the time stamp.

Furthermore, to increase security, preferably different signing keys are used for generating the digital signature of the device certificate and for generating the digital signature of the pieces of status information.

If an unauthorized use of a signing key used for signing a first certificate in the certificate chain is identified, advantageously a digitally signed piece of status information is generated for the certificate subsequent to the first certificate in the certificate chain, wherein the piece of status information comprises a revocation information identifying as invalid the certificate subsequent to the first certificate in the certificate chain for all checking times after the time at which the unauthorized use has been detected.

In a particularly advantageous embodiment of the method, the secret which is cryptographically bound to a certificate information of the device certificate forms the private part of an asymmetric key pair, wherein the secret preferably is a unique secret. Thus, preferably, the private key of the key pair is stored in the device in non-readable manner, and the public key of the key pair is part of the certificate information of the device certificate, wherein the device is adapted to enable, by means of the stored secret, a check whether a binding of the device certificate to the device exists. For example, the device is adapted to receive a value, to encrypt this value with the stored private key based on a predefined encryption algorithm, and to output the result in response to receiving the value, so that the output value can be decrypted with the public key comprised in the device certificate and can be compared with the original value, wherein in case of a match a binding of the device certificate to the device exists.

In a preferred embodiment of the invention, the secret is stored in a chip of the device. This chip may advantageously be provided as a chip according to the specification of the Trusted Platform Module (TPM) of the trusted computing group, short TPM chip, in which a private key referred to as PRIVEK of an asymmetric key pair referred to as "endorsement key" is stored. Also, such a TPM chip may itself represent the electronic device for which a device certificate is created. In this case, advantageously a further device certificate, for example in the form of an attribute certificate may be provided, which serves to confirm that a particular TPM chip is included in the device. Advantageously, the further device certificate may be provided in the same manner as the device certificate, i.e. it may for example be stored in the same memory or storage medium or be provided retrievably via the same directory service.

A method for checking the validity of a device certificate created by the method as described above comprises to provide a device certificate and a trusted certificate, wherein the device certificate is linkable with the trusted certificate via a certificate chain, wherein the certificate chain is a sequence of at least two certificates starting with the device certificate and terminating with the trusted certificate, wherein each certificate in the certificate chain comprises an information defining the validity period of the respective certificate, and wherein each certificate of the certificate chain with the exception of the device certificate comprises a certificate information by means of which the respective previous certificate in the sequence is authenticatable, and to define an associated checking time for each certificate in the certificate chain. A valid definition of a validity period may in particular comprise an unlimited validity towards the past or future, i.e. one end or both ends of the validity period are unlimited. For this purpose, for example respective values may be used for the beginning and/or the end of the validity period, which due to a predefined convention represent an unlimited validity.

On this basis, a first number of checks is performed, namely a check whether the device certificate is successfully authenticatable by means of the certificate chain, whether for each certificate of the certificate chain the associated checking time is within the validity period of the respective certificate, and, by means of a secret stored in a memory of the device, whether a binding of the device certificate to the device exists. If the result of the check is negative in at least one point, the device certificate is identified as invalid.

The described method for creating a device certificate for an electronic device and the described method for checking the validity of a device certificate so created together constitute a method for confirming the identity of an electronic device for the purposes of verification of authenticity or ownership. The methods of the invention in particular provide protection against counterfeiting of a device certificate.

In a first variant of the checking method, an associated digitally signed piece of status information is provided for the device certificate, which piece of status information identifies the device certificate as valid or invalid and comprises an information defining the validity period of the piece of status information. According to this embodiment variant it is additionally checked for the provided piece of status information whether a checking time predefined for the piece of status information is within the validity period of the piece of status information, and whether the piece of status information identifies the device certificate as valid, wherein an identification of the device certificate as valid comprises a proof that the device certificate was indeed created by an authorized entity. If this checking result is positive and the above-described first number of checks is successful, the device certificate is identified as valid, otherwise as invalid.

Advantageously, an associated digitally signed piece of status information is provided for at least one further certificate of the certificate chain, which piece of status information identifies the further certificate as valid or invalid and comprises an information defining the validity period of the piece of status information. In this embodiment it is checked for each provided piece of status information whether the checking time predefined for the piece of status information is within the validity period of the respective piece of status information and whether the piece of status information identifies the respective associated certificate as valid, and the device certificate is only identified as valid in case of a positive result of the check.

For the purpose of checking validity, with advantage the piece of status information may respectively be requested from a certificate information service. Particularly advantageously, a provided piece of status information comprises positive evidence of the existence and validity of the respective certificate, which means that the identification of the certificate as valid by the piece of status information advantageously comprises the proof that the certificate was generated by an authorized entity, wherein this proof may for example be derived from the fact that the certificate or information derived from the certificate is stored in a predefined database, for example. To check whether a certificate or information derived from the certificate is stored in a predefined database, the server providing the certificate information service may preferably communicate with the database via a communications network.

Particularly advantageously, the method for checking validity proposes a special validity model wherein the checking times for the certificates of the certificate chain and/or for the associated pieces of status information are defined in a specific manner.

In the simplest case, the point in time at which the validity check of the device certificate is performed may be defined as the associated checking time for at least one of the certificates of the certificate chain and/or at least one of the pieces of status information.

According to a second variant of the checking method, a digitally signed timestamp associated with the device certificate is provided, which associates the device certificate with a point in time, wherein the point in time associated with the device certificate through the timestamp is defined as the associated checking time for at least one of the certificates of the certificate chain.

In this second embodiment variant it is additionally checked whether the timestamp is successfully authenticatable. If this is the case and the above-described first number of checks is also performed successfully, the device certificate is identified as valid, otherwise as invalid.

Also in this second embodiment variant an associated digitally signed piece of status information can advantageously be provided for at least one certificate of the certificate chain, wherein the piece of status information identifies the certificate as valid or invalid and comprises an information which defines the validity period of the piece of status information. As has been described above for the first embodiment variant, it is checked in this embodiment for each provided piece of status information whether a checking time defined for the piece of status information is within the validity period of the respective piece of status information, and whether the status information identifies the respectively associated certificate as valid, and the device certificate is only identified as valid in case of a positive checking result. Also in this embodiment variant, a provided piece of status information preferably comprises positive evidence of the existence and validity of the respective certificate.

Particularly advantageously, also, the point in time associated with the device certificate via the digitally signed timestamp may be defined as the associated checking time for at least one of the pieces of status information. In a particularly advantageous embodiment of the method, the point in time at which the validity check of the device certificate is performed is defined as the associated checking time for the device certificate, and for all further certificates of the certificate chain the point in time associated with the device certificate via the authenticated timestamp is defined. In particular, the time of checking is only compared to the validity period of the device certificate, whereas for all other validity criteria including those of the device certificate, the time from the timestamp is used, which means that in this embodiment in particular no revocation information for the device certificate is considered.

Furthermore, advantageously the point in time at which the preceding certificate in the certificate chain was created or at which the validity period of the preceding certificate in the certificate chain starts may be defined as the associated checking time for at least one of the certificates of the certificate chain and/or for the piece of status information associated with this certificate.

The validity model employed in the validity check may also comprise a combination of the variants described above.

With particular advantage the validity model is adapted so that all pieces of information required for the validity check of the device certificate can be gathered at the time of creation of the device certificate. These pieces of information in particular comprise all certificates of the certificate chain used to authenticate the device certificate, respectively associated pieces of status information, and, where applicable, required proofs for checking the validity of the pieces of status information. If a timestamp is used, the pieces of information in particular also comprise all information and proofs that are required for authenticating the timestamp itself.

Depending on the application, the device certificate may have the function of an authenticity certificate or ownership certificate and/or may be provided in the form of an attribute certificate, wherein an authenticity certificate is usually issued by the device manufacturer to enable a device owner to verify the authenticity of a device, an ownership certificate is issued by the device owner himself for identifying his property, and an attribute certificate serves to confirm a particular property of a device, for example to confirm that a particular module such as a TPM chip is integrated in a device.

Preferably, the certificate chain comprises at least one intermediate certificate which is arranged between the device certificate and the trusted certificate in the sequence defined by the certificate chain, wherein the trusted certificate preferably is a self-signed root certificate. The intermediate certificate in particular serves to authenticate a signing key used by the device manufacturer for signing device certificates, hereinafter referred to as Manufacturer's Attestation Key (MAKey). The employed MAKeys may as well be organized in a plurality of hierarchy levels, wherein in this case the certificate chain comprises several intermediate certificates. Intermediate certificates may also be completely dispensed with, for example in case the device certificates are directly signed using a root key.

The technical problem mentioned above is furthermore solved by a system for creating device certificates for electronic devices, wherein the system is adapted to perform the method for creating device certificates for electronic devices as described above. Accordingly, the system comprises a production computer with a signing key stored therein for creating device certificates for electronic devices, wherein the production computer is adapted to access a memory of the respective electronic device. For this purpose, the production computer is connectable to at least one electronic device, preferably via a communications network.

In a first variant, the system further comprises a database connectable to the production computer, in which the production computer stores created device certificates or values derived therefrom, wherein the database is adapted to provide upon request information about whether a requested device certificate or a value derived from a requested device certificate is stored in the database.

In a second variant, the system comprises a server connectable to the production computer, which provides a timestamp service and which upon request from the production computer generates a digitally signed timestamp for a device certificate predefined by the production computer and transfers the digitally signed timestamp to the production computer, wherein the timestamp associates the predefined device certificate with the time at which the timestamp is generated.

In a particularly preferred embodiment, the system comprises the features of both variants described above.

The system may further advantageously be adapted to perform each of the above-described embodiments of the method for creating device certificates for electronic devices and may comprise further appropriate components for this purpose.

The technical problem mentioned above is further solved by a checking system for checking the validity of a device certificate, wherein the checking system is adapted to perform the validity checking method described above. Accordingly, the checking system comprises a checking device for checking the validity of a device certificate stored in a memory of an electronic device by means of a certificate chain, and a certificate information server which the checking device can access to request a piece of status information for at least one certificate of the certificate chain. For this purpose, the checking device advantageously comprises an appropriate checking application in form of a software.

The checking system may further advantageously be adapted to perform each of the above-described embodiments of the method for checking the validity of a device certificate and may comprise further appropriate components for this purpose. For example, the checking system may further comprise a database or a database extract which the certificate information server can access for generating pieces of status information which include positive proofs.

The technical problem mentioned above is also solved by an electronic device comprising a memory which is not readable from outside the device with a secret stored therein, and a readable memory, wherein in the readable memory all pieces of information required for performing the above-mentioned method for checking the validity of a device certificate are stored, in particular the device certificate, all other certificates of the certificate chain required for the validity check of the device certificate, and pieces of status information, and/or timestamps. The stored pieces of information are respectively selected depending on the information required for the respective embodiment of the method for checking the validity.

If all information for performing a validity check on a device certificate stored in the device are stored in the electronic device, a validity check can particularly advantageously be performed offline, i.e. without access to further information sources. In particular access to a certificate information server can be dispensed with, so that in this case a checking system particularly advantageously only comprises the checking device and the electronic device to be checked.

It is usually not necessary to store the trusted certificate, for example provided in the form of a self-signed root certificate, in the device, since the checking device itself will typically know this certificate.

Furthermore, with special advantage the checking device may be provided by the device to be checked itself, i.e. the device to be checked itself may be adapted to perform the validity check on the stored device certificate and may accordingly include an appropriate checking application for this purpose.

It is also possible that the pieces of information required for performing the above-described method for checking the validity of a device certificate are fully or partially stored in a memory associated with the device instead of in a memory included in the device.

Accordingly, the technical problem mentioned above is further solved by a storage medium which is associated with an electronic device, wherein the electronic device comprises a memory that is not readable from outside the device and which has a secret stored therein, and wherein the storage medium has stored therein all pieces of information required for performing the above-described method for checking the validity of a device certificate, in particular the device certificate, all further certificates of the certificate chain required for the validity check of the device certificate, as also pieces of status information, and/or timestamps.

The storage medium may for example be provided in the form of a CD enclosed with the device. However, any other suitable form of a storage medium also lies within the scope of the invention. The association of the storage medium with the electronic device may be accomplished alone by providing them as a joint set. However, it is also possible for the storage medium to be appropriately labeled, for example in that a serial number of the device is stored in or printed on the storage medium.

The invention permits particularly easily to automatically identify certificates as counterfeits, which were produced by unauthorized use of the associated signing keys.

BRIEF DESCRIPTION OF THE DRAWINGS

The invention will now be exemplary described in more detail by way of preferred embodiments and with reference to the accompanying drawings. Therein same or similar parts in the drawings are designated by the same reference numerals. It is shown in:

FIG. 5b schematically a checking system adapted for checking the validity of device certificates created with a system as illustrated in FIG. 5a;

FIG. 6b schematically a checking system adapted for checking the validity of device certificates created with a system as illustrated in FIG. 6a;

FIG. 7b schematically a checking system adapted for checking the validity of device certificates created with a system as illustrated in FIG. 7a;

FIG. 11b schematically a checking system adapted for checking the validity of device certificates created with a system as illustrated in FIG. 11a.

DETAILED DESCRIPTION

In the embodiments of the invention described below it is assumed that a chip manufacturer manufactures and markets trusted platform modules (TPMs), hereinafter referred to as TPM chip or TPM for short, each of which are issued by the manufacturer with a unique key pair referred to as endorsement key (EK) consisting of a private (PRIVEK) and a public part (PUBEK). The PRIVEK is generated and stored within the TMP without ever leaving it.

The device manufacturer integrates a TPM into his device. In doing so, the device manufacturer creates, by an own Certification Authority (CA), an electronically signed certificate (endorsement certificate, EK certificate) in the form of a public key certificate which digitally signs the public part (PUBEK) of the endorsement key.

The signature of the EK certificate is generated by using a private key which is only at the disposition of the device manufacturer. This private key will in the following be referred to as Manufacturer's Attestation Key (MAKey).

Prior to the generation of the EK certificate, the device manufacturer's own certification authority is used to confirm the public key associated with the MAKey as belonging to the device manufacturer, also by means of a public key infrastructure. The certificate associated with the MAKey will be referred to as MACert below. It is used in the rank of a so-called intermediate certificate of a certification authority (intermediate CA certificate, sub-CA certificate). Where appropriate, the device manufacturer uses a plurality of private keys during manufacturing, e.g. MAKey1, MAKey2, MAKey3 and so on. For each private key there exists a corresponding certificate MACert1, MACert2, MACert3 and so on. All these certificates have been directly or indirectly confirmed by the certification authority of the manufacturer, for example by using the root key of the certification authority, hereinafter referred to as Manufacturer's Trust Anchor Key, short MTAKey, for digitally sign them. The root key is confirmed by means of a self-signed root certificate (in the following referred to as Manufacturer's Trust Anchor Certificate, short MTACert) and is published by the manufacturer.

Figure 1:
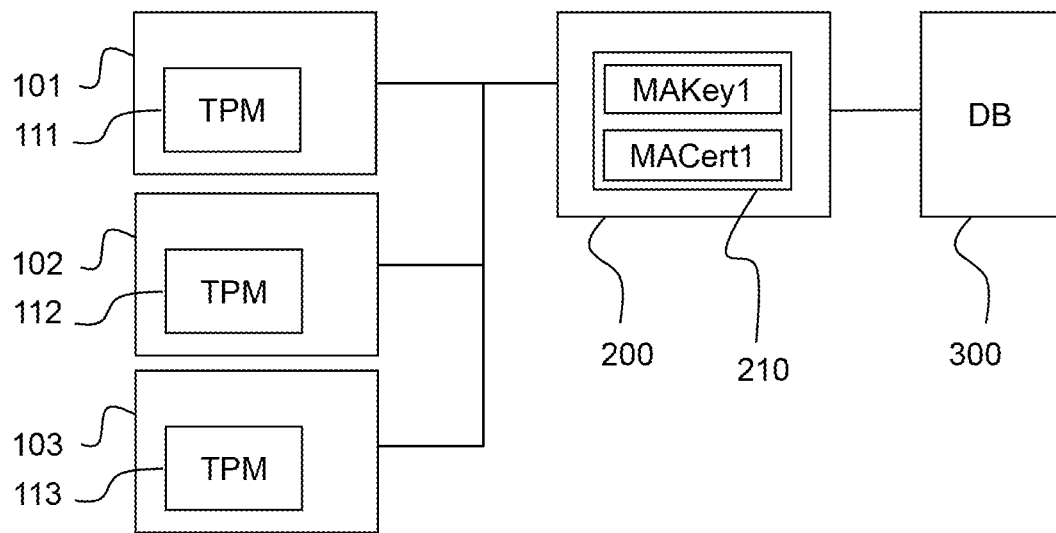
FIG. 1 a schematic diagram of an exemplary system for creating device certificates for electronic devices.

The infrastructure of a device manufacturer for this procedure is exemplified in FIG. 1. At a production workstation 200, key MAKey1 and certificate MACert1 are employed, wherein these are stored in a memory 210. The certificate was issued by a private certification authority not shown in FIG. 1, that is now turned off. By way of example, devices 101, 102, and 103 are initialized at production workstation 200, which devices have already been assembled and each of which contains a TPM 111, 112, and 113, respectively, each of which in turn comprises an individual EK. At production workstation 200, a device certificate (EKCert1, EKCert2, ...) is created for the PUBEK of a TPM by being signed with the MAKey1 using a software application. In the illustrated exemplary embodiment the device certificate is stored together with the MACert1 in a persistent memory of device 101, 102, and 103, respectively. For this purpose, production workstation 200 is connected to devices 101, 102, and 103 via a communications network, wherein preferably a plurality of devices may simultaneously be connected to the communications network. As an alternative to storing the device certificate and the certificate MACert1 in a memory of device 101, 102, and 103, respectively, this data may as well be stored in a storage medium such as a compact disc (CD), which is associable with the device, for example enclosed with the device. Since, in principle, it is only necessary that the data is retrievably provided in a manner associable with the device, the data may as well be provided via a directory service, for example, from which it can be retrieved when needed. However, any other suitable manner of provisioning may as well be employed.

In the illustrated example, the created device certificates are furthermore stored in a manufacturer database 300 which can be accessed from the production workstation 200. The connection between production workstation 200 and manufacturer database 300 may be established via the same or a different communications network or via a direct link.

Later, for example after acquisition of a device, a device owner uses the root key from the root certificate (MTACert) as published by the manufacturer to electronically validate the authenticity of the device. According to a common procedure, for example, the device owner uses a software tool that knows the MTACert and receives, via communication paths to the device, the corresponding EK certificate (EKCert1, EKCert2, ...) and all relevant intermediate certificates, e.g. MACert1, from the device. The software tool then checks the certification path, also referred to as certificate chain below, from the device certificate (EK certificate) to the root certificate (MTACert) by checking the validity of this path, in particular in accordance with RFC 5280. In this way, only the authenticity of the EK certificate is determined, restricted under the condition that until the time of checking none of the private keys used by the manufacturer (MTAKey and MAKey1, MAKey2, MAKey3, ...) has been used without authorization.

Figure 2:
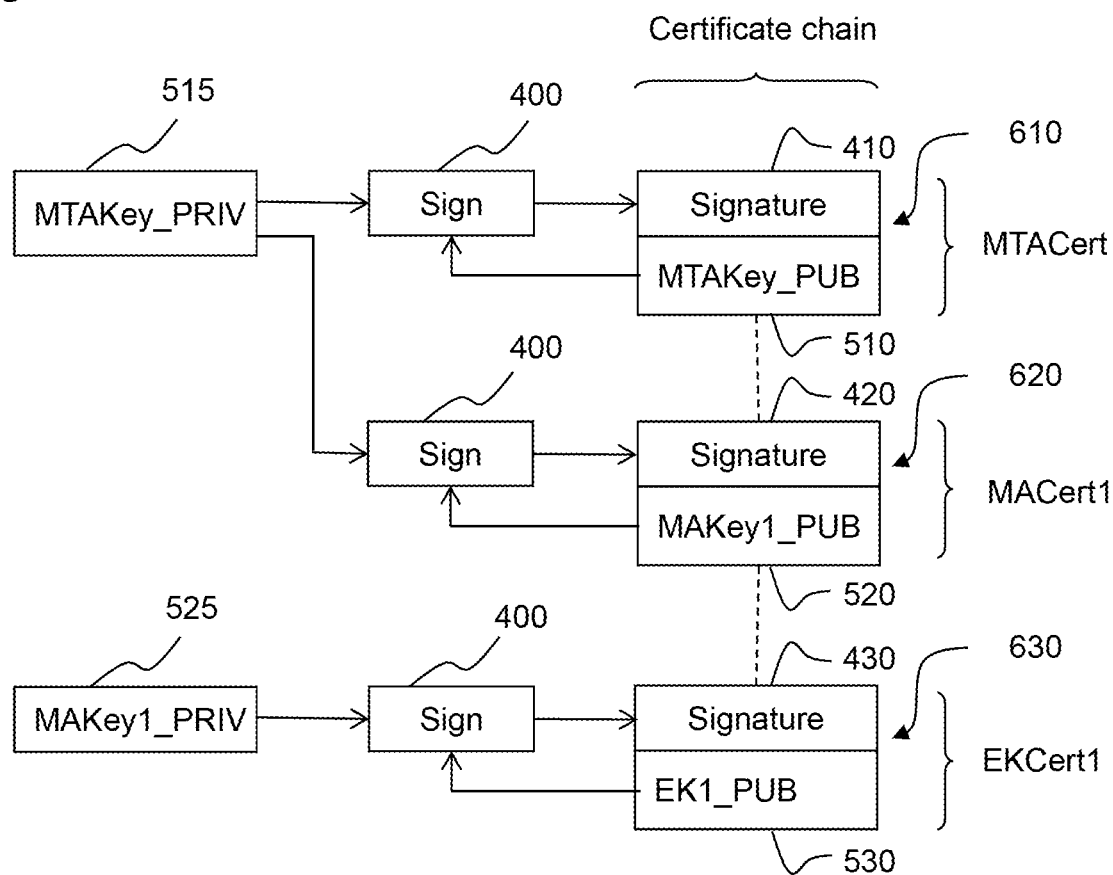
FIG. 2 schematically a certificate chain used for checking the validity of a device certificate.

An example of a certification path is illustrated in FIG. 2. Accordingly, the certificate chain includes the device certificate 630 designated EKCert1, the intermediate certificate 620 designated MACert1, and the root certificate 610 designated MTACert.

Device certificate 630 comprises certificate information 530 and signature 430 which is generated by a signing process 400 in which the certificate information 530 is encrypted with the private key 525 designated MAKey1 PRIV. Alternatively, the signing process 400 may be designed in such a way that not certificate information 530 is digitally signed, but a cryptographic checksum determined from certificate information 530, such as a hash value of certificate information 530 is encrypted with private key 525 designated MAKey1_PRIV.

Certificate information 530 of device certificate 630 comprises the public key EK1_PUB. Additionally, certificate information 530 may comprise further pieces of information, such as information about the validity period of device certificate 630, an identification information of the certificate issuer, information about the owner of public key EK1_PUB, information regarding rules and procedures under which device certificate 630 has been issued, and/or details on the permissible scope of application and validity of public key EK1_PUB.

Intermediate certificate 620 comprises certificate information 520 and signature 420 which is generated by a signing process 400 in which certificate information 520 or a cryptographic checksum generated from certificate information 520 is encrypted with private key 515 designated MTAKey PRIV. Certificate information 520 of intermediate certificate 620 comprises at least the public key MAKey1_PUB and, where appropriate, further pieces of information analogously to the pieces of information described above with reference to certificate information 530.

Root certificate 610 comprises certificate information 510 and digital signature 410. Root certificate 610 is self-signed, i.e. the digital signature is generated by a signing process 400 in which certificate information 510 or a cryptographic checksum generated from certificate information 510 is encrypted using MTAKey PRIV. Certificate information 510 of root certificate 610 comprises at least the public key MTAKey PUB, and, where appropriate, further pieces of information analogously to the pieces of information described above with reference to certificate information 530 and 520.

Figure 3:
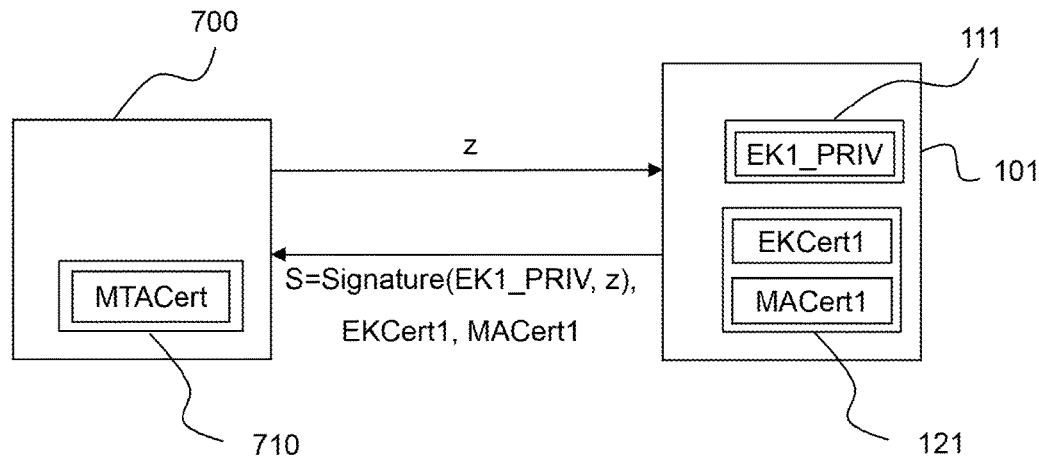
FIG. 3 a schematic diagram of an exemplary checking system adapted for checking the binding of a device certificate to an electronic device.

As illustrated in FIG. 3, in a next step the software tool ensures that the EK certificate EKCert1 actually belongs to the present device 101. Various methods may be used for this purpose. For example, the software tool which is for instance installed in a checking computer 700 prompts the device 101, via a communications channel, to sign a random number z generated by the software tool, using the private key PRIVEK, which is designated EK1_PRIV in the illustrated example and which is stored in the TPM 111. In technical terms this implies encryption of the random number z or of a value derived in dependence of z using the PRIVEK. The value derived in dependence of the random number z may for example be a cryptographic checksum of z, or a cryptographic checksum of z and further information, wherein the cryptographic checksum may for instance be a hash value, and the further information may be known to the device and may optionally also be publicly known. As soon as the device 101 returns the signature S, the software tool checks the signature by decrypting from signature S the random number z or the cryptographic checksum generated from z using the public key PUBEK designated EK1_PUB in the illustrated example, which is included in EK certificate EKCert1, and by respectively comparing it with the original random number z or a cryptographic checksum derived in dependence of the original random number z. To this end, in the illustrated exemplary embodiment the certificates EKCert1 and MACert1 stored in memory 121 are transferred from device 101 to the checking computer 700 together with the signature S. The certificate MTACert is typically already stored in a memory 710 of checking computer 700.

According to the specification of the TPM chip, the PRIVEK is not extractable from the TPM 111 and is globally unique. Accordingly, authenticity of the device 101 is identified by the described procedure, under the aforementioned limitations and provided the TPM chip 111 was not removed from the device 101 and integrated into another device. Manufacturers of TPM chips often create a respective EK certificate already during manufacturing of the chips. Accordingly, in this case, EK and EK certificate are generated at the TPM chip manufacturer's. The difference to the case described above is that a certification authority (CA) is required at two locations to confirm authenticity. One certification authority is required at the TPM chip manufacturer's and another one at the device manufacturer's. Furthermore, the issuing of a public key certificate by the device manufacturer may be dispensed with. Instead, the device manufacturer issues an attribute certificate for the existing EK certificate thereby confirming that a particular TPM was integrated in a particular device. The attribute certificate is referred to as a platform EK certificate.

Figure 4:
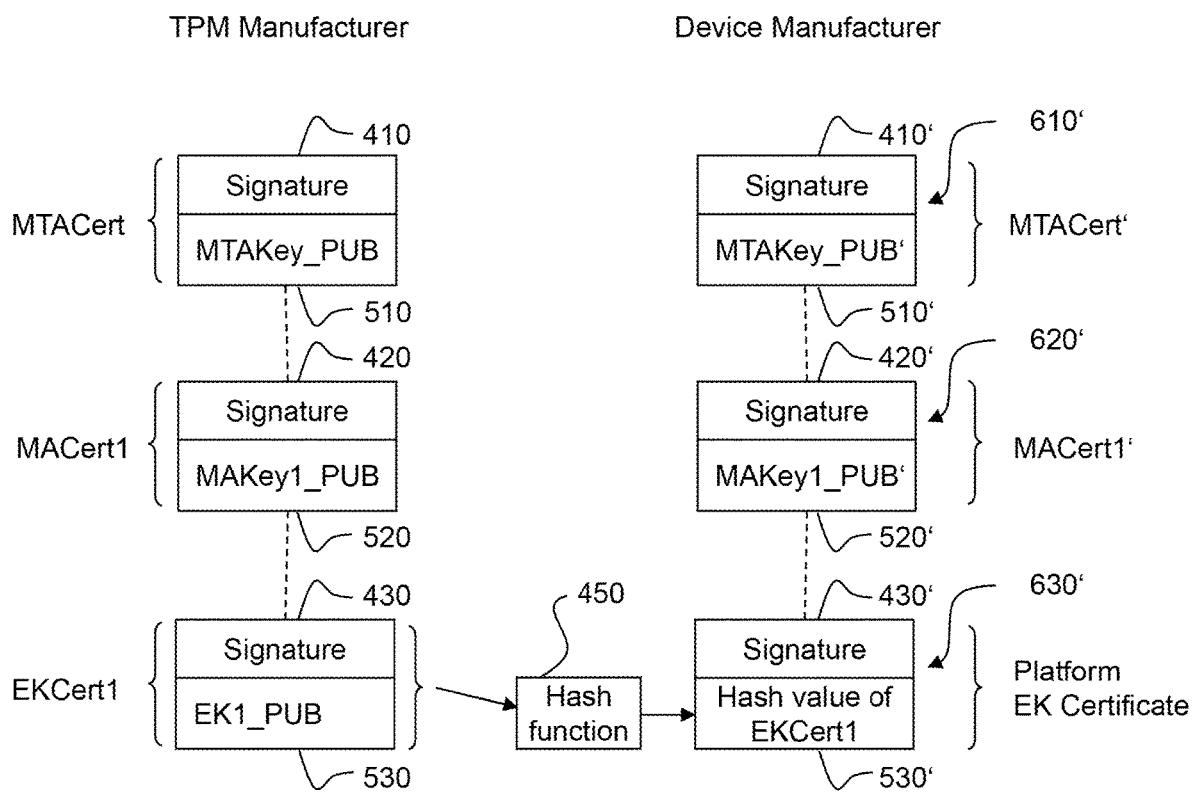
FIG. 4 schematically two separate certificate chains for checking the validity when using an attribute certificate to a device certificate.

The added value for the future device owner is that the authenticity of the TPM chip as well as the authenticity of the device can be checked separately. In this case two root certificates are required and two certificate chains are checked but only one signature is verified. The two certificate chains are illustrated in FIG. 4. There, the connection between the platform EK certificate without public part EK1_PUB of EK1 and the EKCert1 with public part EK1_PUB of EK1 exists due to a reference, for example in the form of a certificate number together with a cryptographic hash value which is calculated from the content of EKCert1 and is included in the platform EK certificate. The certificate chain shown on the left side of FIG. 4 for authentication of the EK certificate EKCert1 created by the TPM manufacturer corresponds to the certificate chain illustrated in FIG. 2. The hash value 530' generated from EKCert1 using a hash function 450 defines the certificate information of the platform EK certificate 630' which further comprises the signature 430'. Platform EK certificate 630' and the further certificates 620' and 610' respectively comprising certificate information 520' and 510' and signatures 420' and 410' are formed analogously to the certificate chain illustrated in FIG. 2.

Certain devices are capable of securely storing private keys without a TPM chip. In such cases, but also for devices with TPM, there is the possibility that during manufacturing of the devices a respective new secret is generated and is provided with a device certificate by the manufacturer. For example, instead of or in addition to the endorsement key (EK), a new asymmetric key pair may be generated and the public key may be confirmed by a certificate of the manufacturer as described above. If a TPM is present, this new key pair may as well be cryptographically bound to the TPM. In both cases a certificate chain as described above is existing. The manufacturer issues a public key certificate. In this variant, however, it is independent of a public key that was created elsewhere. In particular, there is no relationship to the public part of an EK that was generated by a TPM manufacturer. This independence may be considered an advantage. However, in this case the manufacturer is responsible for the uniqueness of the key pair.

Figure 8:
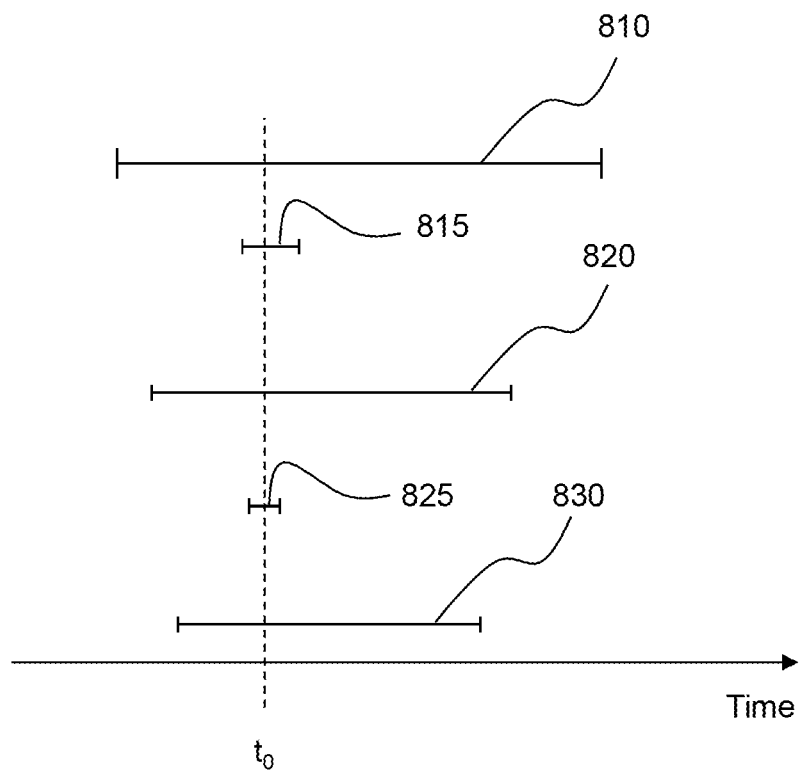
FIG. 8 a schematic diagram of the validity periods of certificates and pieces of status information when using a first preferred validity model.

The relevant validity periods when using a PKIX procedure are illustrated in FIG. 8 by way of example. Typically the root certificates have a very long validity period 810 of several years. For the PKIX procedure, the validity period of the root certificate covers those of all dependent certificates. Thus, the validity period 810 for certificate MTACert illustrated in FIG. 8 also covers those for certificates MACert1 and EKCert1, designated by reference numeral 820 for MACert1 and by reference numeral 830 for EKCert1. For sub-CA certificates it is also true that their validity period covers those of all dependent certificates. Accordingly, in FIG. 8 the validity of MACert1 covers that of EKCert1.

When a certificate chain consisting of MTACert, MACert1, and EKCert1 is checked for validity at a time $t_0$, according to PKIX the time $t_0$ has to be within the validity periods of all these certificates. If revocation information is taken into account, the time $t_0$ must also be within the validity period thereof. FIG. 8 shows that for all certificates directly dependent on root certificate MTACert, here for example MACert1, a Certificate Revocation List (CRL) was fetched during the checking process. This certificate revocation list might have been signed, in accordance with PKIX, for example with the MTAKey associated with MTACert. Since usually the key for root entities is very rarely used and is otherwise kept secure separate from operations, a certificate revocation list issued by the root entity will often have a rather long validity period 815 of several days, for example, in practical operations. For all other certificates, individual revocation information relating to this certificate is usually provided by the issuing authority on request, for example via Online Certificate Status Protocol (OCSP), said individual revocation information having a relatively low data volume. Their validity period 825 is rather short, for example one hour.

Originally, the checking of certificate chains was not intended for long-term verification of certificates. The checking procedure is optimized for ad hoc verification of the identity of communication partners when establishing a connection. For device certificates it is not suitable without further modification already because it is difficult to predict the maximum service life of devices, especially in the industrial sector, and to use for the usually extended periods of time sufficiently strong and therefore durable cryptographic algorithms that are also supported by common implementations. Moreover, for example according to the PKIX standard a root or sub-CA certificate with a remaining validity period of 3 years is not suitable for still issuing certificates depending thereon and having a validity period of 5 years, because the validity period of dependent certificates has to be covered by the validity period of the higher level certificate.

Therefore, in contrast to the PKIX standard, the invention in particular comprises that status information provide positive evidence and/or that certificates need only have been valid at the issuing time of signatures to be checked thereby. The second point enables that the validity period of certificates need not be within the validity period of the certificate of the issuer, but may be longer.

Ideally, by the invention certificates, which were generated by unauthorized use of the associated signing keys, shall be automatically identified as counterfeits.

The intentional or accidental abuse of Manufacturer Attestation Keys (MAKeys) as described above represents a relatively high risk for the device manufacturer. This is because the MAKeys are usually employed in large production halls with complex IT networks. Indeed, MAKeys can be securely stored using secure signature creation units such as so-called crypto tokens or smart cards so that copying of the private part is impossible with a negligible residual probability. Nevertheless, there is a risk that the keys are used without authorization. In particular, in case of contract manufacturing beyond the direct control of a rights holder there is a real risk of overproduction and sale of the goods for own account. There is a risk of damage by loss of business. If, moreover, the counterfeit products are of poor quality, an additional risk arises from the increased likelihood of product liability cases and the risk of image loss.

The invention provides a cost-efficient precaution for the event that signing keys for creating device certificates, such as for example MAKey1, MAKey2, MAKey3, etc., have been compromised.

In particular, it is possible to identify counterfeit products as such without extraordinary measures by the legitimate device manufacturer or rights holder, although these devises are provided with a device certificate which was abusively created with a correct signing key.

Furthermore, in particular in the industrial sector there exists the risk of abusive use of Device Owner Attestation Keys (DOAKeys) as they are described above. This is because a plurality of devices is in use at a multitude of industrial locations, so that replacement devices must be put in operation or new ones must be added with a relatively high frequency. Accordingly, for practical usability devices need to be supplied with device certificates on site, and therefore some DOAKeys are in use in the field where the monitoring of the use thereof is not always possible with the utmost care.

For this field of application the invention also provides a cost-efficient precaution for the event that signing keys for creating device certificates, such as for example DOAKey1, DOAKey2, DOAKey3, etc., have been compromised.

In particular, the device owner will detect without extraordinary measures that he has a device in his possession whose device certificate was created without his consent, such as for example by abusive use of the correct signing key. For attackers it is interesting to plant manipulated devices into the inventory of an owner. For them it will be all the more advantageous if such devices are not detected.

The invention in particular provides for the following variants:

1. The checking procedure according to the PKIX standard is extended by the requirement for a status information for device certificates, wherein the status information comprises positive evidence of the existence and validity of the device certificate.

2. A specific validity model for device certificates is applied, wherein the requirement for positive evidence relating to the device certificate in the status information is dispensed with. An electronic timestamp serves as a substitute, which documents the time of issue of the device certificate and which was signed by a different signing key than the device certificate.

3. Device certificates are created along with a proof of existence and a timestamp, and a special validity model is applied. This variant therefore represents a combination of the first two variants.

In particularly for the second and third variant, the invention furthermore particularly advantageously enables checking of validity of the device certificates without the need for fetching additional pieces of status information about certificates and therefore independently of communications networks.

The variant of the invention described below is based on a combination of the checking of device certificates according to the PKIX standard with the additional requirement of a status information about the existence of the device certificate.

Figure 5A:
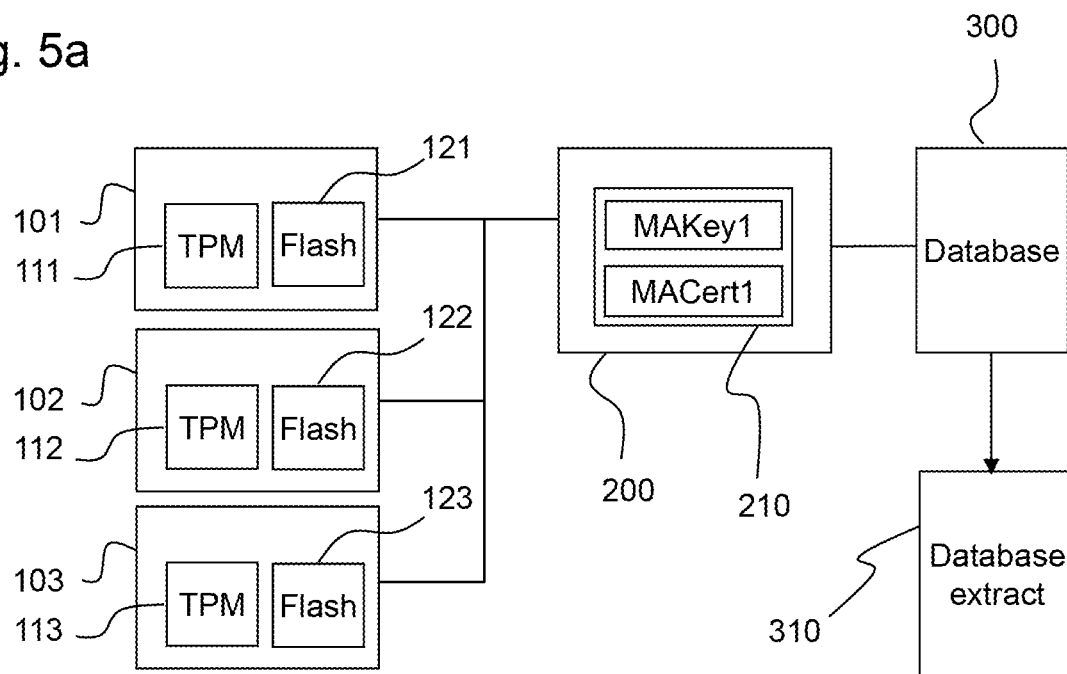
FIG. 5a a schematic diagram of a first preferred embodiment of a system for creating device certificates.
Figure 5B:
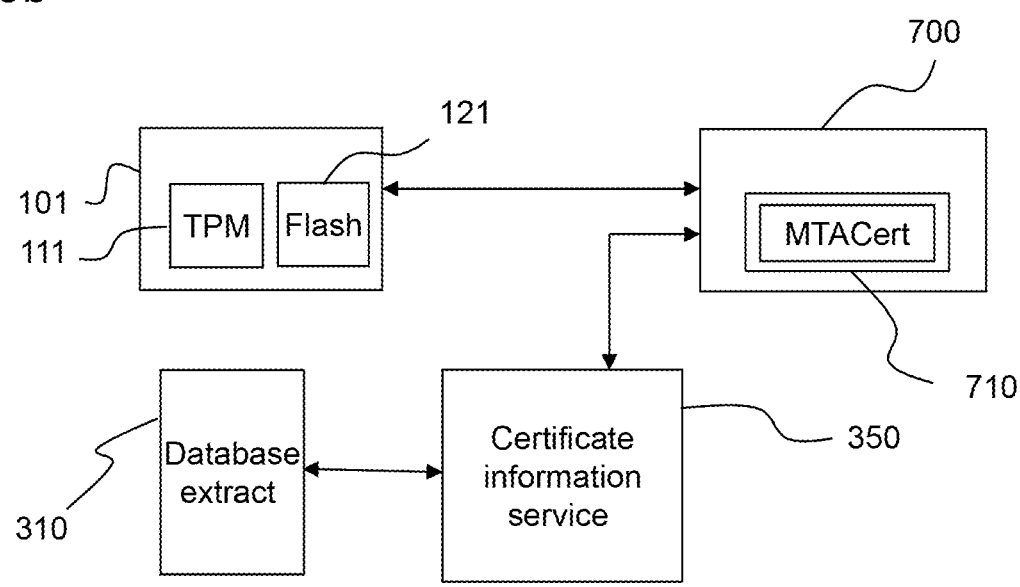

A system for creating device certificates that can be employed for this variant is exemplary illustrated in FIG. 5a, and a corresponding system for checking the validity to be used by the device owner is exemplary illustrated in FIG. 5b.

A method for creating device certificates in conjunction with a corresponding method for checking the validity of a device certificate so created comprises for example the following steps:

1. A device manufacturer produces devices 101, 102, and 103 and issues a device certificate for each device using an MAKey, in the illustrated exemplary embodiment MAKey1. The issuing of a device certificate is accomplished as described above.

2. After production and test, all device certificates for a batch of produced devices are stored in the device database 300 of the manufacturer. Here, a check on whether the number of devices produced conforms with the production order is ideally performed by an independent body, and only if the number is correct the device certificates are entered into the database.

3. Optionally, an automatism generates an extract 310 from the device database 300, which substantially merely includes the device certificates. This extract is protected by conventional data security measures. It serves as the basis for a certificate information service 350 which is operated by the manufacturer with public accessibility and which is needed by the device owner to check device certificates.

4. The devices 101, 102, and 103 of the batch are released for sale, for example by being transferred to the warehouse of the manufacturer.

5. A person receives a device 101, for example by placing an order with the manufacturer and delivery of the device. The person thus becomes the device owner.

6. The device owner checks the certificate chain of the device 101 and the binding of the EK certificate to the device 101 by a procedure documented by the manufacturer using the certificate MTACert as a trust anchor. This step has been described in detail above. For this purpose, the device owner uses, for example, a software tool that knows the MTACert or to which he makes it known. The software tool may be provided by the device manufacturer, for example.

7. The device owner fetches a proof of existence for the device certificate from an information service 350 of the device manufacturer using a procedure documented by the device manufacturer, for example by means of a software tool using the online certificate status protocol (OCSP). The information service 350 looks up the certificate in the extract 310 of device database 300 or directly in device database 300 and provides the desired information.

Thus, the use of an extract 310 from device database 300 is optional. Such an extract 310 is advantageously used so that a public service does not have to directly access a company's internal database 300 and so that access to the service does not directly place a load on database 300. Steps 6 and 7 are performed at a time chosen by the device owner and are repeated at will.

The effect of the method described above becomes apparent when considering a supposed abuse of a correct MAKey1 for the purpose of creating fake device certificates. The counterfeit device certificates would not be entered into database 300 in step 2, for example because a discrepancy is detected in a comparison to the production order, or because the abusive use of MAKey1 happens without the possibility of access to database 300, for example outside the manufacturing site. In step 7, the proof of existence for the counterfeit device certificate will be negative and the device owner will detect the counterfeit product. The effectiveness of the method is therefore in particular achieved by steps 2 and 7.

The method provides protection even if the MAKey1 is not stolen or copied but rather is abused sporadically and without being detected.

Now, a variant of the above method will be described below, which is particularly suitable if devices are manufactured by a contractor of the property rights holder.

Figure 6A:
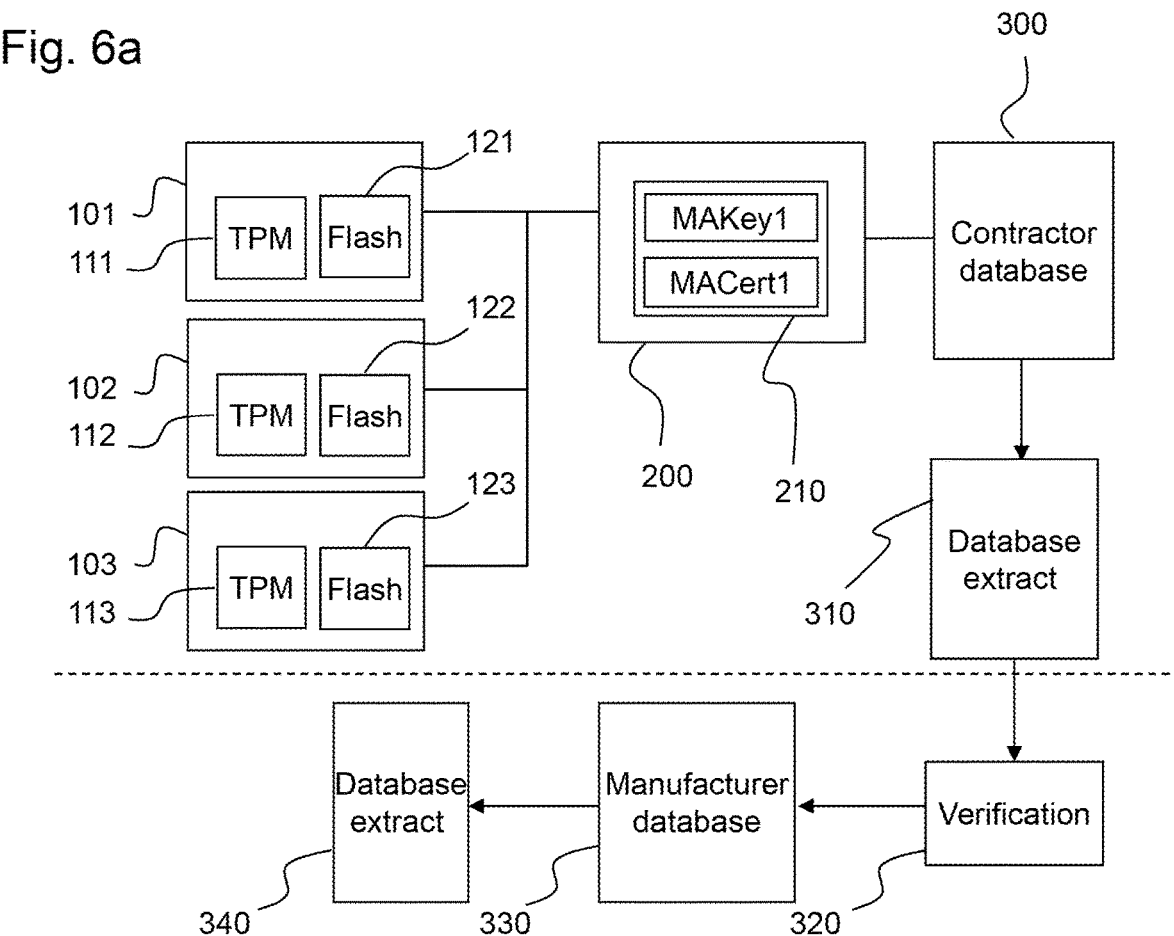
FIG. 6a a schematic diagram of a second preferred embodiment of a system for creating device certificates.
Figure 6B:
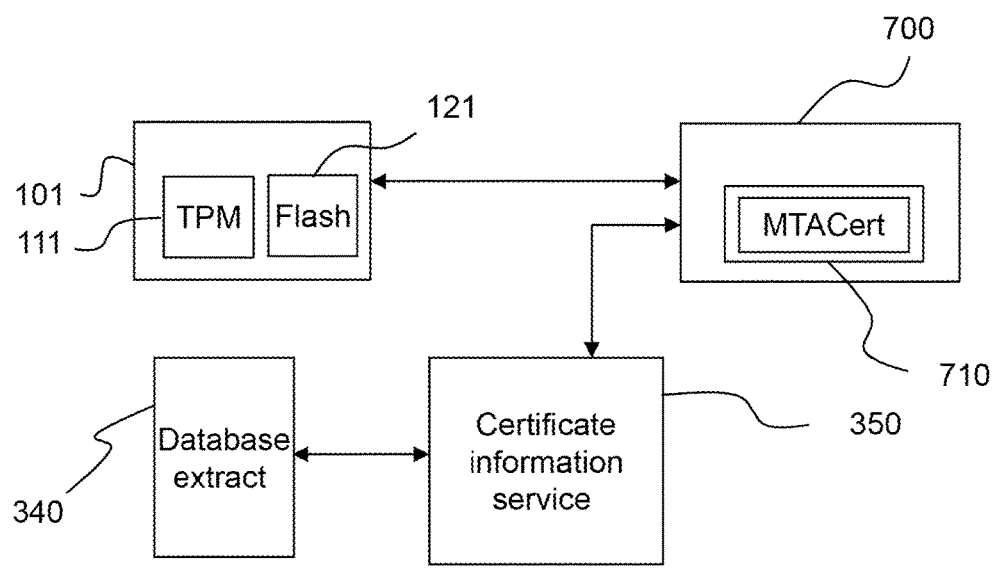

A system for creating device certificates that can be employed for this variant is exemplary illustrated in FIG. 6*a*, and a corresponding system for checking the validity for use by the device owner is exemplary illustrated in FIG. 6*b*.

A corresponding method for creating device certificates in conjunction with a corresponding method for checking the validity of a device certificate so created comprises for example the following steps:

1. A contractor produces a batch of devices 101, 102, and 103 on behalf of the property rights holder or manufacturer. At production workstation 200, a device certificate is issued for each device 101, 102, and 103 using an MAKey1 supplied by the manufacturer and an associated MACert1.

2. The contractor maintains a partial database 300 including the EK certificates of all devices 101, 102, and 103 he has produced.

3. The contractor generates an extract 310 from this database 300 for each batch of devices, in which the device certificates are included.

4. The contractor provides these extracts to the manufacturer.

5. The manufacturer controls the extracts by comparing them with the production orders he placed, by means of a verification system 320. For example, extracts 310 are only accepted if the number of reported devices matches that of the orders. Only in this case he enters the device certificates and possibly further information into his device database 330.

6. Optionally, the manufacturer generates an extract 340 from his device database 330 for use by the information service 350 he is operating for his device certificates.

7. After examination by the manufacturer the batch of newly produced devices is released for distribution, for example by having them transferred to the warehouse at the contractor's.

8. A person receives a device 101, for example by placing an order with the manufacturer and delivery by the contractor. The person thus becomes the device owner.

9. The device owner checks the authenticity of the device 101 by checking the certificate chain and checking the binding of the EK certificate to the device 101 as described above.

10. The device owner fetches a proof of existence for the device certificate from the manufacturer, as described above. Here, analogously to the previously described variant, the security of the method is in particular given by steps 5 and 10. The verification of the number of device certificates by the manufacturer as a client before entering them into his device database 330 is crucial for this variant of the method, because in this way unauthorized overproduction of devices is prevented. Moreover, the device owner fetches the proof of existence exactly from the information service 350 which is under the control of the manufacturer. For example, the procedure for fetching the proof of existence is clearly described in the documentation for the devices, or the software tool for checking the device certificates is provided by the manufacturer and only uses the information service 350 of the manufacturer.

The methods described above for proofs of existence for authenticity certificates may analogously be used for ownership certificates as well, wherein then the following modifications are provided:

The device owner does not produce the devices but merely personalizes them by identifying them with ownership certificates.

It is not the device manufacturer nor the contractor who creates the device certificates, but the device owner using a DOAKey as described above.

It is not the device manufacturer nor the contractor who maintains a device database comprising the device certificates, but the device owner.

It is not the device manufacturer who operates a certificate information service for proofs of existence for the device certificates, but the device owner.

It is not the device manufacturer who provides the root certificate as a trust anchor, but the device owner using his DOTACert.

Thus, the device owner contributes to the strength of the method by rigorously following the steps within his organization. Furthermore, for the effectiveness of the method the verification prior to entering device certificates into the device database may be separated from the step of issuing device certificates using the DOAKey. In particular, a DOAKey does not serve as an authorization criterion for adding certificates to the device database.

In another variant of the invention a specific validity model is combined with a proof that a certificate was created prior to a specified point in time. This proof is called a timestamp, wherein a possible format for electronic timestamps is described, for example, in "RFC 3161 Internet X.509 Public Key Infrastructure Time-Stamp Protocol (TSP)", Internet Engineering Task Force (IETF), 2001. In this exemplary format, a hash value of an existing document together with a date and time is electronically signed by a trusted authority.

The difference of this variant of the invention to the proof of existence described above lies in two points:

1. The timestamp is generated at the time of creation of the device certificate or shortly thereafter, whereas the proof of existence is generated at the time of checking the device certificate. A proof of existence is not necessary. A certificate revocation information is sufficient.

2. The checking of the validity of the certificate of the issuer (sub-CA certificate) of the device certificate is not effected for the point in time the device certificate is checked but for the point in time of issue of the device certificate.

As a result of these differences, when employing the method only those device certificates can be identified as counterfeit which were created using the correct key after the sub-CA certificate has been revoked. Revocation for example occurs upon detection that such a key has been compromised. Thus, the method permits limitation of the economic damage but not quite its prevention. On the other hand, its application is possibly more cost-efficient than the use of a proof of existence.

This variant of the invention will be described in more detail below. In the description of the method which follows the terms production facility, manufacturer, and customer are placeholders. A manufacturer is the holder of rights relating to devices which are manufactured on his behalf. The manufacturer either controls the manufacturing facility and thus produces himself, or the manufacturing facility is owned by a contractor who produces devices on behalf of the manufacturer. A customer is a person who comes into possession of a device. It is irrelevant in this regard whether the device was purchased directly from the manufacturer.

Figure 7A:
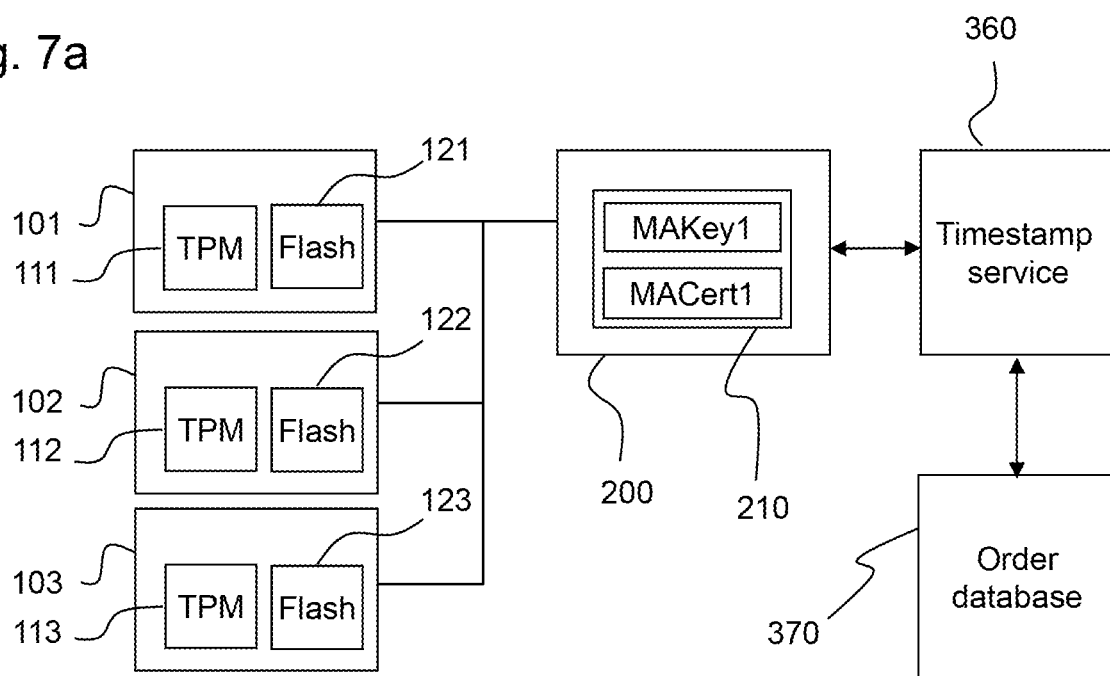
FIG. 7a a schematic diagram of a third preferred embodiment of a system for creating device certificates.
Figure 7B:
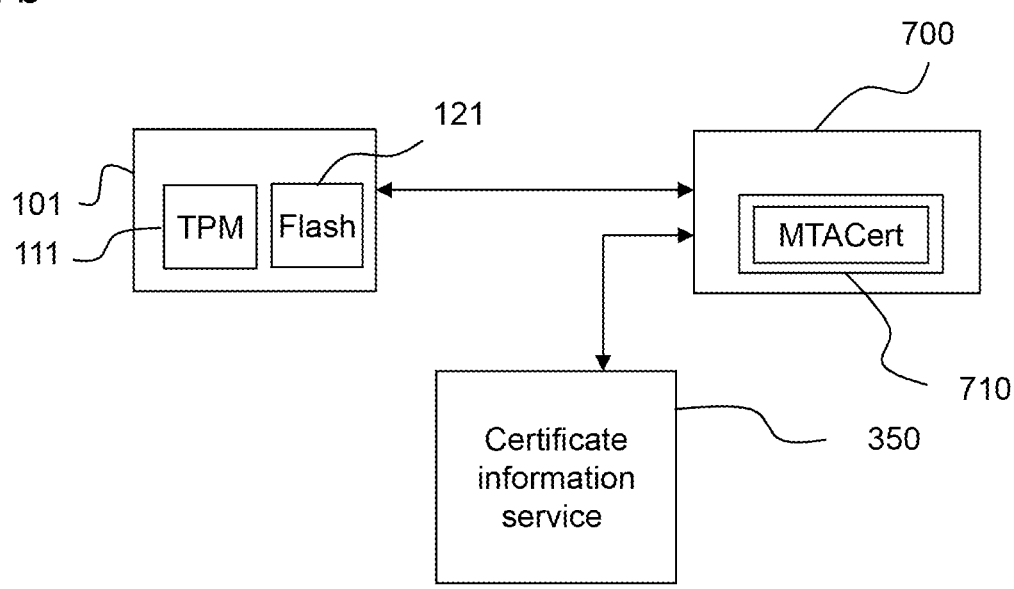

A system for creating device certificates that can be employed for this variant is exemplary illustrated in FIG. 7a, and a corresponding system for checking the validity for use by the device owner is exemplary illustrated in FIG. 7b.

A corresponding method for creating device certificates in conjunction with a corresponding method for checking the validity of a device certificate so created comprises for example the following steps:

1. The manufacturer instructs the production facility to produce a certain number of devices 101, 102, and 103. Optionally he enters the production order into his order database 370, for example using an Enterprise Resource Planning system (ERP system).

2. At the production workstation, a batch of devices 101, 102, and 103 is produced.

3. For each device an individual device certificate is created, for which purpose an MAKey, in the illustrated example MAKey1, is available at production workstation 200.

4. For each created device certificate or for all device certificates of a batch together, timestamps are requested from a timestamp service 360. For this purpose, the timestamp service 360 may be operated by the manufacturer himself or by another trusted authority.

5. Optionally, the timestamp service 360 checks whether an adequate production order exists in the order database 370 of the manufacturer.

6. The timestamp service 360 creates a timestamp. In each device 101, 102, and 103 a copy of the timestamp associated with its device certificate is enclosed. For example, the timestamp is stored in the device near the device certificate, in a memory 121, 122, and 123, respectively.

7. The device 101, 102, or 103, respectively, is released for distribution, for example by being transferred to the warehouse.

8. A person purchases a device 101 thereby becoming the device owner.

9. The device owner checks the certificate chain of the device 101 and the binding of the EK certificate to the device 101 by means of a procedure documented by the manufacturer using the certificate MTACert as a trust anchor. This step has been described in detail above. The checking of the certificate chain is performed by means of a special validity model using information from the timestamp associated with the device certificate as will be described in more detail below. For this purpose, the device owner for example uses a software tool that either knows the MTACert or to which he makes it known. The software tool may for example be provided by the device manufacturer.

Figure 9:
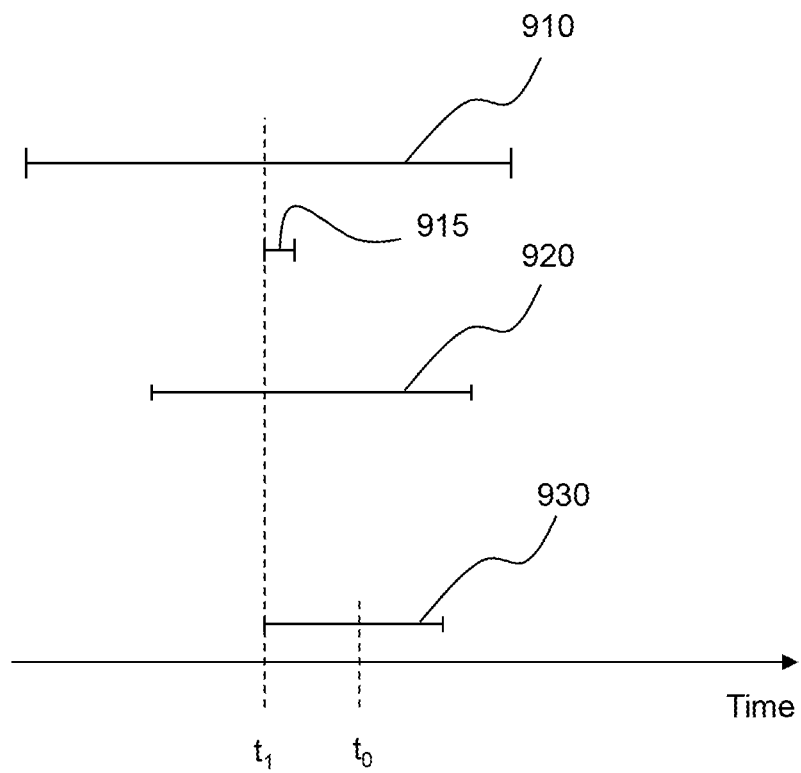
FIG. 9 a schematic diagram of the validity periods of certificates and pieces of status information when using a second preferred validity model.

The particular validity model for checking a certificate chain referred to in the above-described step 9 is illustrated in FIG. 9 and will be described below. FIG. 9 illustrates validity periods 910, 920, and 930 for a certificate chain comprising only three certificates, however, in principle any number of intermediate certificates (sub-CA certificates) may be provided.

The particular validity model comprises the following steps:

9.1. First, the timestamp associated with the device certificate is checked for validity according to the rules of its issuer and its binding to the device certificate is verified.

9.2. The time $t_0$ of the checking of the device certificate must be within the validity period 930 of the device certificate.

9.3. The time $t_1$ of the generation of the timestamp as specified in the timestamp must be within the validity period of all certificates of the certificate chain and must lie before $t_0$.

9.4. For each intermediate certificate of the certificate chain, a certificate revocation information must be available which is valid for time $t_1$, i.e. $t_1$ must be within the validity period 915 of the certificate revocation information. The revocation information need not have to provide existence information for the respective certificate but must confirm that the associated certificate has not been revoked at time $t_1$. Hence, it is acceptable if the certificate was revoked at a time after $t_1$. The responsible certification service therefore has to pursue a revocation policy according to which revocations can only be effected with a validity starting at the current point in time but may never be withdrawn.

The validity model described above effectively means that a device certificate will be verified as valid until its validity period 930 or the validity period of the corresponding timestamp has expired, whichever occurs first. These two validity periods should preferably be adjusted, by the device manufacturer, to the expected service life of the device and the expected resilience duration of the algorithms used for the certificates and the timestamp.

To ensure sufficient security of the latter method described above, it is proposed to meet the following conditions:

a) As soon as an unauthorized use of keys for generating device certificates is detected or assumed, the associated sub-CA certificates are permanently revoked, effective as of this point in time. This must be guaranteed by the operator of the associated certification service and the authorized user of the keys.

b) The timestamp service always generates timestamps only for the currently valid time. This is guaranteed by every reliable timestamp service.

c) The timestamp service must not use any key for issuing timestamps, which is also used for issuing device certificates.

d) The revocation information service must not use any key for issuing information, which is also used for issuing device certificates.

Assuming that no unauthorized person is able to issue valid timestamps, an unauthorized person will only be able to successfully counterfeit device certificates at most until the unauthorized issuing is detected. The economic damage can thus be limited as soon as it is detected.

The methods for creating and checking authenticity certificates as lastly described above may analogously be used for ownership certificates, wherein in this case the following modifications are provided:

The device owner does not produce the devices but merely personalizes them by identifying them with ownership certificates.

It is not the production facility that creates the device certificates, but the device owner using a DOAKey as described above.

It is not the production facility that requests the timestamp, but the device owner.

The timestamp service is not selected by the device manufacturer, but by the device owner.

It is not the device manufacturer but the device owner who operates a revocation information service for intermediate certificates (sub-CA certificates) of the certificate chains of the device certificates.

It is not the device manufacturer who provides the root certificate as a trust anchor, but the device owner using his DOTACert.

From the description of the above validity model it will be apparent that any certificate revocation information that is to be fetched needs only be valid at the time $t_1$ of the creation of the timestamp. This also applies to later points in time at which the verification of the device certificate is repeated. Hence, it is possible to fetch all pieces of status information once and to reuse them later. A device manufacturer may enclose these pieces of status information with the certificates of authenticity he issues. Analogously, a device owner can do this for the ownership certificates he issues. This extension permits a later check of device certificates without having access to a communications network, i.e. offline. Hereinafter, this extension will be described in more detail but analogously for the further variant of the invention described below.

According to the further variant of the invention described below the device certificate is combined with a timestamp to confirm its time of issue, and furthermore the device certificate is checked using a validity model which provides proofs of existence for the certificates except for the root certificate.

This essentially corresponds to a combination of variants of the invention already described above, wherein it is in particular advantageously enabled to check device certificates later without further fetching additional information, due to particular provisions during the generation of these certificates.

Any required additional information may be delivered along with the device or stored in or with it. This in particular permits a check independently of access to communications networks like the Internet, i.e. offline.

Figure 10:
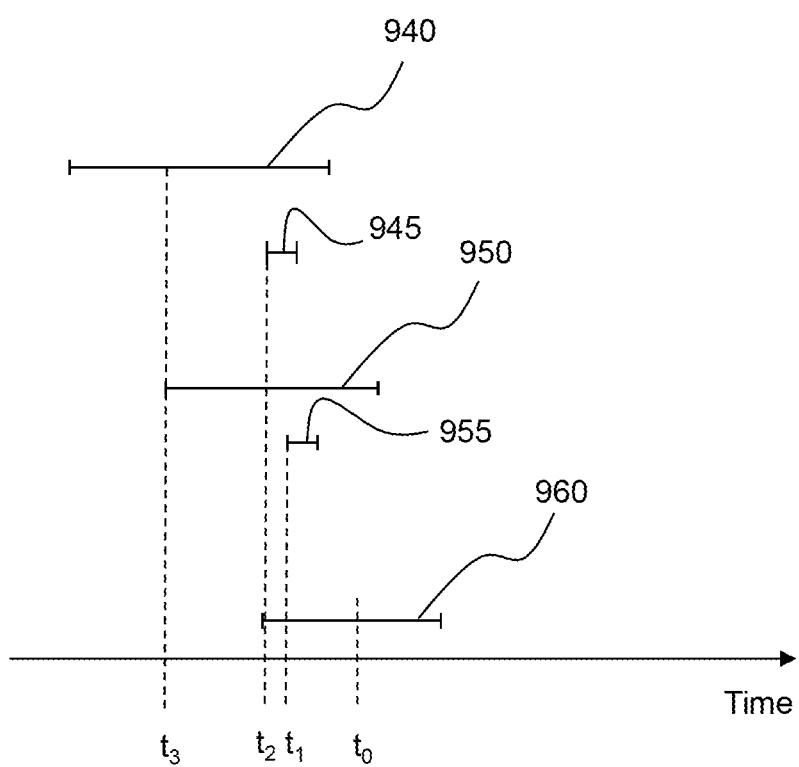
FIG. 10 a schematic diagram of the validity periods of certificates and pieces of status information when using a third preferred validity model.

Regardless of whether device certificates are created as certificates of authenticity or as ownership certificates a method for creating device certificates and for verifying their validity, with reference to FIG. 10, proposes that for each device certificate the following happens or is true:

1. After creating a device certificate and before it is checked for a first time, a timestamp is generated for the device certificate. Where appropriate, the timestamp is generated for a set of device certificates, such as a batch of devices.

2. Each time the validity of device certificates is checked, the following conditions are checked:

2.1. Binding of the device certificate to a secret key needs to be proofed.

2.2. It has to be possible to establish a certificate chain from the device certificate to a trusted root certificate.

2.3. The time $t_0$ of the check needs to be within the validity period 960 of the device certificate.

2.4. The timestamp for the device certificate needs to be checked for validity according to the rules of the issuer. This in particular includes verification of a binding of the timestamp to the device certificate.

2.5. The time $t_1$ of the generation of the timestamp as specified in the timestamp must be within the validity period 960 of the device certificate and must lie before time $t_0$.

2.6. A piece of status information for the device certificate must exist, must be valid for the time $t_1$, i.e. $t_1$ must be within the validity period 955, and must confirm for this point in time:

2.6.1. that the device certificate was issued by a legitimate authority, i.e. provide a proof of existence, for example because it is listed in the database of the issuer; and 2.6.2. that the device certificate has not been revoked at time $t_1$.

2.7. For each intermediate certificate in the certificate chain (each sub-CA certificate) it needs to be true:

2.7.1. that the time of issue $t_N$ of the certificate in the chain directly dependent therefrom, for example the start of the validity period thereof, is within the validity period 950 of the intermediate certificate, wherein in the illustrated example this is the time of issue $t_2$ of the device certificate;

2.7.2. that for the intermediate certificate a status information exists which is valid for the time $t_N$, and which confirms the existence of the intermediate certificate (proof of existence) and that it was valid at time $t_N$, i.e., in the illustrated example, that $t_2$ is within the validity period 945 of the status information for the intermediate certificate.

2.8. The time $t_3$ of issue of the intermediate certificate directly dependent on the root certificate must be within the validity period 940 of the root certificate.

The validity model described above under point 2 is illustrated in FIG. 10. The validity periods illustrated therein are based on a certificate chain consisting of 3 certificates. However, the described method can as well be applied for certificate chains with several intermediate certificates (sub-CA certificates).

The security of the method lies in that device certificates issued by an unauthorized entity are detected because of a lacking timestamp, the absence of a proof of existence, and/or because of a timestamp with an issue time which lies after the certificate of the issuing key has been revoked.

To this end the following conditions are advantageously met:

a) As soon as an unauthorized use of keys for generating device certificates is detected or assumed, the associated sub-CA certificates are permanently revoked, effective as of this point in time. This must be guaranteed by the operator of the associated certification service and the authorized user of the key.

b) The timestamp service always generates timestamps only for the currently valid time. This is guaranteed by every reliable timestamp service.

c) The timestamp service must not use any key for issuing timestamps, which is also used for issuing device certificates.

d) The status information service creating revocation information and proofs of existence for the certificates in the chain must not use a key for this purpose, which is also used for issuing device certificates.

From the description of the above validity model it will be apparent that all pieces of information additionally required for the device certificate can be fetched at the time $t_1$ of the creation of the timestamp. This also applies to information and proofs which are necessary to check the timestamp itself. These pieces of information may be enclosed with the device certificate. Thus, they do not need to be fetched again during subsequent checks. Instead, the check can be reproduced at any time using these pieces of information.

Figure 11A:
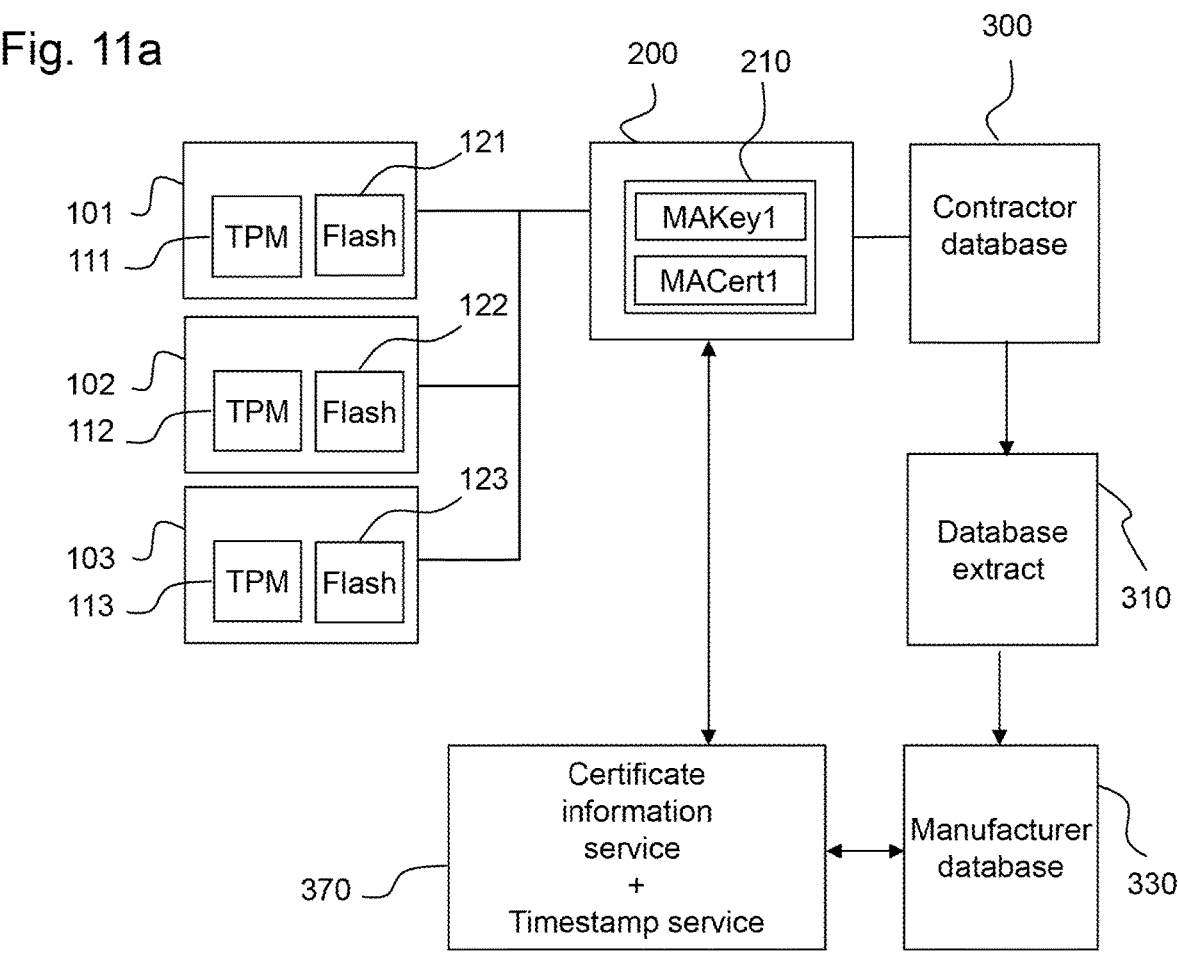
FIG. 11a a schematic diagram of a fourth preferred embodiment of a system for creating device certificates.
Figure 11B:
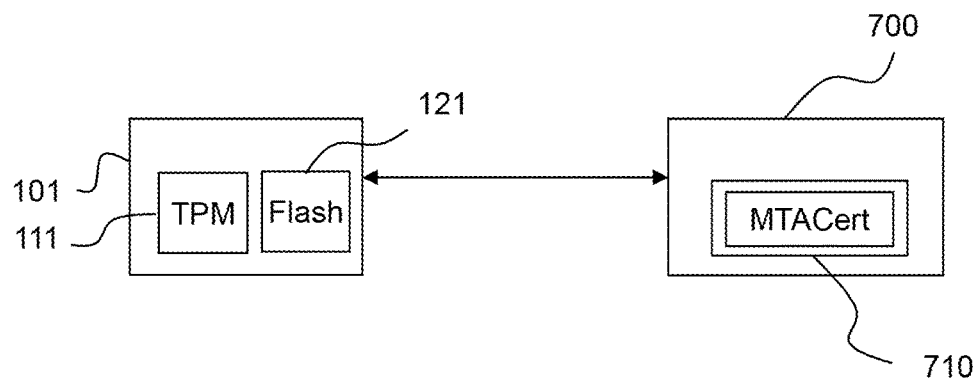

The method for gathering the information will be exemplary described below with reference to FIGS. 11a and 11b in order to illustrate which information can be derived from where. In the description of the method which follows the terms production facility, manufacturer, and customer are placeholders. A manufacturer is the holder of rights relating to devices which are manufactured on his behalf. The manufacturer either controls the manufacturing facility and thus produces himself, or the manufacturing facility is owned by a contractor who produces devices on behalf of the manufacturer. A customer is a person who comes into possession of a device. It is irrelevant in this regard whether the device was purchased directly from the manufacturer.

In this embodiment of the invention, a method for creating device certificates in conjunction with a corresponding method for checking the validity of a device certificate so created for example comprises the following steps:

1. The manufacturer instructs the production facility to produce a certain number of devices 101, 102, and 103. Optionally he enters the production order into an order database not shown in FIG. 11a, for example in his Enterprise Resource Planning system (ERP system).

2. At the production workstation a batch of devices is produced.

3. For each device 101, 102, and 103, respectively, an individual device certificate is created, for which purpose an MAKey1 is available at production workstation 200. The production facility transmits the device certificates of a batch to the manufacturer, for example using a partial database 300 of the contractor and a database extract 310 generated therefrom.

4. With the manufacturer the list is checked, for example by comparison with the order database. In case the check is positive, the device certificates are stored in the database 330 of the manufacturer.

5. For each created device certificate or for all device certificates of a batch together, timestamps are requested from a timestamp service 370. For this purpose, the timestamp service may be operated by the manufacturer himself or by another trusted authority. Additionally, a status information with proof of existence and revocation information is fetched for each device certificate or for all certificates of the batch. This is provided by the manufacturer. Before providing the information, the status information service 370 checks the existence of the devices based on device database 330 or an extract thereof. The timestamp and the status information are enclosed with the devices 101, 102, and 103 or even stored therein, for example in a memory 121, 122, and 123, respectively.

6. The device is released for distribution, for example by being transferred to the warehouse.

7. A person purchases a device 101, thereby becoming the device owner.

8. The device owner checks the certificate chain of the device and the binding of the EK certificate to the device 101 by a procedure documented by the manufacturer using the certificate MTACert as a trust anchor. The checking of the certificate chain is performed by means of a special validity model as described above. The pieces of status information and timestamps already provided are used for this purpose.

For example, the device owner uses a software tool for this purpose, that either knows the MTACert or to which he makes it known. The software tool may be provided by the device manufacturer, for example. As illustrated in FIG. 11b, for the check the checking computer 700 therefore only needs access to the device 101, but not to other sources of information.

The gathering of proofs for ownership certificates is performed analogously, with the following modifications:

The device owner does not produce the devices but merely personalizes them by identifying them with ownership certificates.

It is not the production facility that creates the device certificates, but the device owner using a DOAKey as described above.

It is not the production facility that requests the timestamps and pieces of status information, but the device owner.

The timestamp service is not selected by the device manufacturer, but by the device owner.

It is not the device manufacturer but the device owner who operates a revocation information service for intermediate certificates (sub-CA certificates) of the certificate chains of the device certificates.

It is not the device manufacturer who provides the root certificate as a trust anchor, but the device owner using his DOTACert.

What is claimed is:

1. A method for checking the validity of an individual device certificate, comprising the steps of:
providing an individual device certificate;
providing a trusted certificate, wherein the device certificate is linkable with the trusted certificate via a certificate chain, wherein the certificate chain is a sequence of at least two certificates starting with the device certificate and terminating with the trusted certificate, wherein each certificate in the certificate chain comprises an information defining the validity period of the respective certificate, and wherein each certificate of the certificate chain with the exception of the device certificate comprises a certificate information by means of which the respective previous certificate in the sequence is authenticatable;
defining an associated checking time for each certificate of the certificate chain;
providing a digitally signed piece of status information that is associated with the device certificate, wherein the piece of status information identifies the device certificate as valid or invalid and comprises an information which defines the validity period of the piece of status information, wherein said digitally signed piece of status information is provided in response to a confirmation information, wherein said confirmation information confirms that the device certificate was created by an authorized entity, and wherein the confirmation information comprises that the device certificate or an information derived from the device certificate is stored in retrievable manner in a predefined database;
defining an associated checking time for the piece of status information associated with the device certificate;
checking:
whether the device certificate is successfully authenticatable by means of the certificate chain;

for each certificate of the certificate chain, whether the associated checking time is within the validity period of the respective certificate;

whether a binding of the device certificate to the device exists, by means of a secret stored in a memory of the device which is not readable from outside the device;

whether the associated checking time of the piece of status information associated with the device certificate is within the validity period of the piece of status information;

whether the piece of status information associated with the device certificate identifies the device certificate as valid, wherein an identification of the device certificate as valid comprises a proof that the device certificate was created by an authorized entity, wherein the proof is derived from the fact that the certificate or information derived from the certificate is stored in the predefined database;

wherein if the check is successful the device certificate is identified as valid, otherwise as invalid;

providing an associated digitally signed piece of status information for at least one further certificate of the certificate chain, wherein the piece of status information identifies the further certificate as valid or invalid and comprises an information which defines the validity period of the piece of status information, and wherein said digitally signed piece of status information is provided in response to a confirmation information, wherein said confirmation information confirms that the device certificate was created by an authorized entity, and wherein the confirmation information comprises that the device certificate or an information derived from the device certificate is stored in retrievable manner in a predefined database;

defining an associated checking time for each piece of status information; and identifying the device certificate as valid only if:
for each piece of status information the associated checking time is within the validity period of the respective piece of status information; and
each piece of status information identifies the respectively associated further certificate as valid, wherein the identification of the further certificate as valid comprises a proof that the further certificate was created by an authorized entity, wherein the proof is derived from the fact that the certificate or information derived from the certificate is stored in a predefined database.

2. The method as claimed in claim 1, wherein the point in time at which the validity check of the device certificate is performed is defined as the associated checking time for at least one of the certificates of the certificate chain and/or at least one of the pieces of status information.

3. The method as claimed in claim 1, wherein the point in time at which the preceding certificate in the certificate chain was created or at which the validity period of the preceding certificate in the certificate chain starts is defined as the associated checking time for at least one of the certificates of the certificate chain and/or for the piece of status information associated with this certificate.

4. The method as claimed in claim 1, wherein the device certificate has the function of a certificate of authenticity or of an ownership certificate, and/or the device certificate is provided as an attribute certificate.

5. The method as claimed in claim 1, wherein the certificate chain comprises at least one intermediate certificate which is arranged between the device certificate and the trusted certificate in the sequence defined by the certificate chain.

6. The method as claimed in claim 1, wherein the trusted certificate is a self-signed root certificate.

7. A system for checking the validity of an individual device certificate, comprising:
a checking device for checking the validity of an individual device certificate stored in a memory of an electronic device by means of a certificate chain, wherein the device certificate is linkable with a trusted certificate known to the checking device via a certificate chain, wherein the certificate chain is a sequence of at least two certificates starting with the device certificate and terminating with the trusted certificate, wherein each certificate in the certificate chain comprises an information defining the validity period of the respective certificate, and wherein each certificate of the certificate chain with the exception of the device certificate comprises a certificate information by means of which the respective previous certificate in the sequence is authenticatable; and a certificate information server which the checking device can access to request a piece of status information for at least one certificate of the certificate chain, wherein the checking device is adapted to request a piece of status information for the device certificate and a piece of status information for at least one further certificate of the certificate chain from the certificate information server, and wherein the checking device is adapted to check:

whether the device certificate is successfully authenticatable by means of the certificate chain;

for each certificate of the certificate chain, whether an associated checking time is within the validity period of the respective certificate;

whether a binding of the device certificate to the device exists, by means of a secret stored in a memory of the device which is not readable from outside the device;

whether an associated checking time of the piece of status information associated with the device certificate is within the validity period of the piece of status information;

whether the piece of status information associated with the device certificate identifies the device certificate as valid, wherein an identification of the device certificate as valid comprises a proof that the device certificate was created by an authorized entity, wherein the proof is derived from the fact that the certificate or information derived from the certificate is stored in a predefined database; and whether the piece of status information associated with the at least one further certificate of the certificate chain identifies the further certificate as valid, wherein an identification of the further certificate as valid comprises a proof that the further certificate was created by an authorized entity, wherein the proof is derived from the fact that the further certificate or information derived from the further certificate is stored in a predefined database;

and wherein the checking device is adapted to identify the device certificate as valid, if the check is successful, otherwise as invalid.

* * * * *